(12) United States Patent
Yamazoe

(10) Patent No.: US 11,256,399 B2
(45) Date of Patent: Feb. 22, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Nobuyuki Yamazoe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/401,687

(22) Filed: May 2, 2019

(65) Prior Publication Data
US 2020/0183573 A1    Jun. 11, 2020

(30) Foreign Application Priority Data
Dec. 5, 2018    (JP) .............................. JP2018-227766

(51) Int. Cl.
| | | |
|---|---|---|
| G06F 3/0484 | (2022.01) | |
| G06F 3/01 | (2006.01) | |
| G09G 5/38 | (2006.01) | |
| G06F 3/0482 | (2013.01) | |
| G06K 9/00 | (2022.01) | |
| G06T 7/70 | (2017.01) | |
| G06T 7/60 | (2017.01) | |

(52) U.S. Cl.
CPC .......... *G06F 3/04845* (2013.01); *G06F 3/011* (2013.01); *G06F 3/0482* (2013.01); *G09G 5/38* (2013.01); *G06K 9/00402* (2013.01); *G06T 7/60* (2013.01); *G06T 7/70* (2017.01); *G09G 2340/0492* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 2002/0168107 A1* | 11/2002 | Tang | .................. | G06K 9/00429 382/187 |
| 2009/0184981 A1* | 7/2009 | de Matos | ........... | H04N 21/8153 345/676 |
| 2011/0122130 A1* | 5/2011 | Vesely | .................... | G06T 15/20 345/419 |
| 2012/0056875 A1* | 3/2012 | Lee | .......................... | G06F 3/012 345/419 |
| 2012/0069055 A1* | 3/2012 | Otsuki | ................. | H04N 13/356 345/681 |
| 2012/0320000 A1* | 12/2012 | Takatsuka | ................ | G09G 5/38 345/179 |

(Continued)

FOREIGN PATENT DOCUMENTS

| | | |
|---|---|---|
| JP | 2013-122529 A | 6/2013 |
| JP | 2016-071857 A | 5/2016 |

*Primary Examiner* — Toan H Vu
(74) *Attorney, Agent, or Firm* — Oliff PLC

(57) ABSTRACT

An information processing apparatus includes a display controller, a detector, a corrector, and an adder. The display controller performs control to display an image on a horizontal screen. The detector detects a position of a user. The corrector corrects an image in accordance with an operation performed on the horizontal screen by a user. The adder adds the image corrected by the corrector to the horizontal screen in accordance with the position of the user and an orientation of the horizontal screen.

16 Claims, 19 Drawing Sheets

(56) References Cited

U.S. PATENT DOCUMENTS

| | | | |
|---|---|---|---|
| 2013/0069880 A1* | 3/2013 | Stark | G06F 3/011 |
| | | | 345/168 |
| 2013/0176341 A1* | 7/2013 | Jung | G06F 3/0304 |
| | | | 345/649 |
| 2013/0222238 A1* | 8/2013 | Sliger | G06F 3/03545 |
| | | | 345/157 |
| 2013/0290867 A1* | 10/2013 | Massand | G06F 3/038 |
| | | | 715/750 |
| 2015/0365625 A1* | 12/2015 | Ishizaki | G06F 3/1423 |
| | | | 348/581 |

* cited by examiner

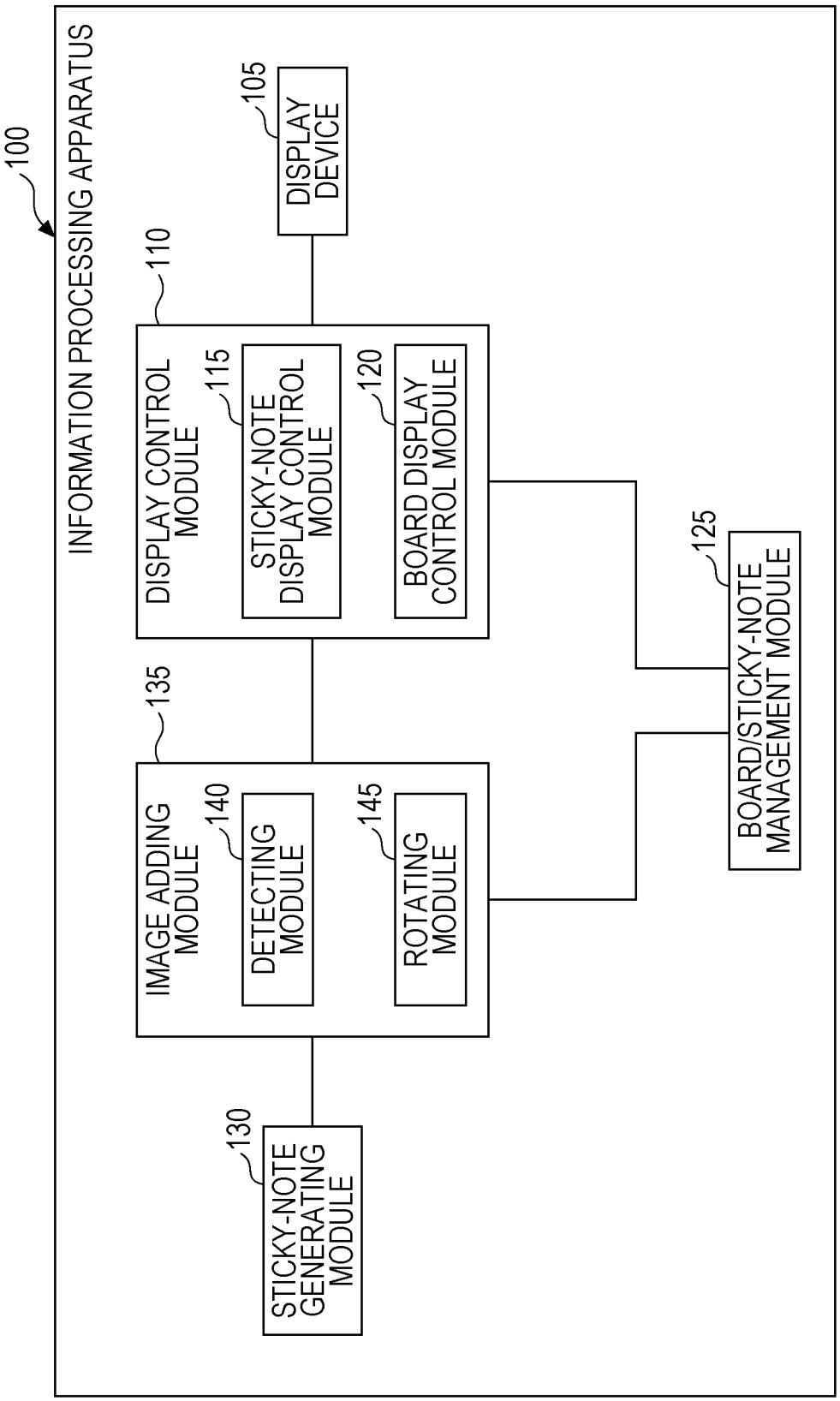

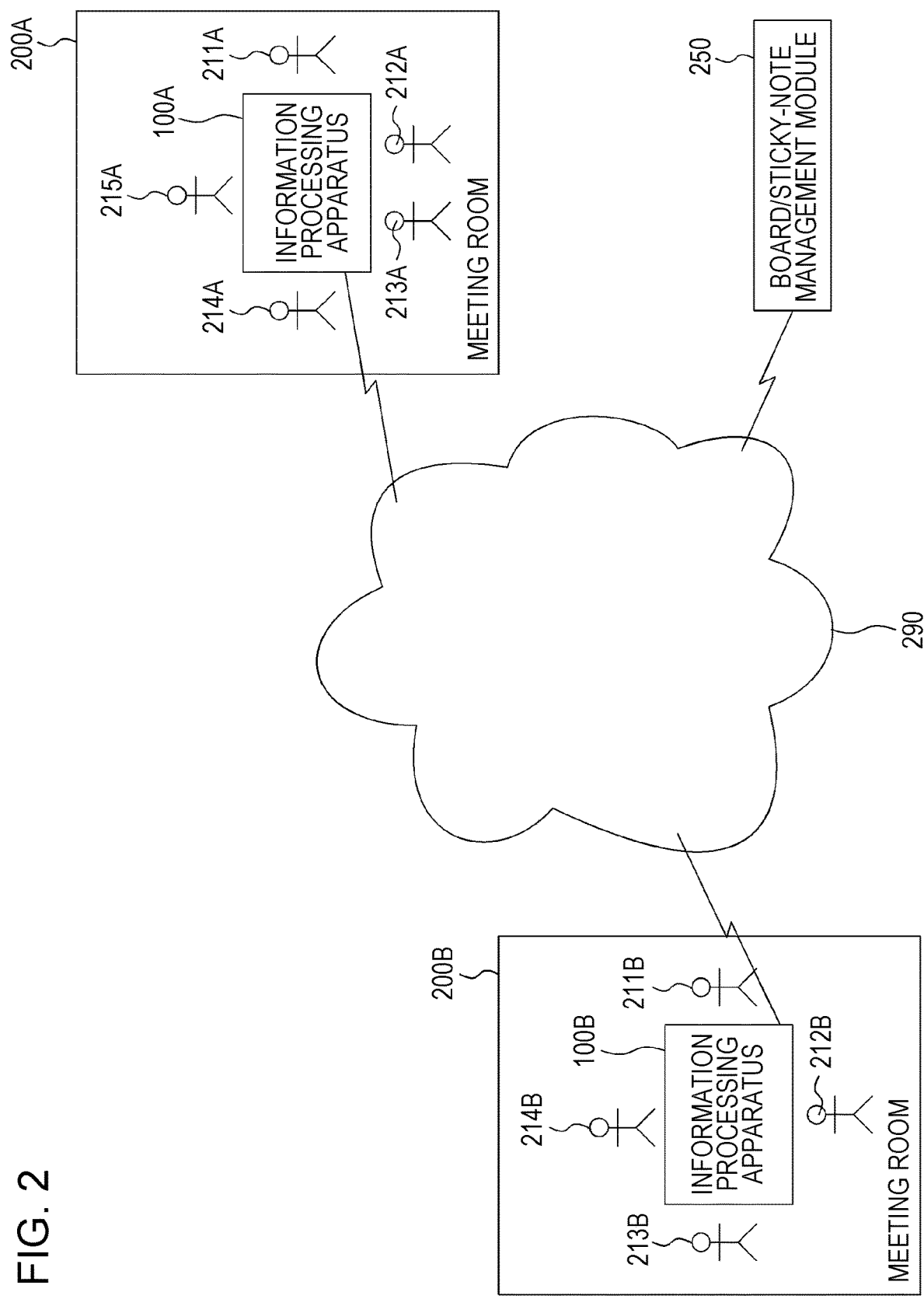

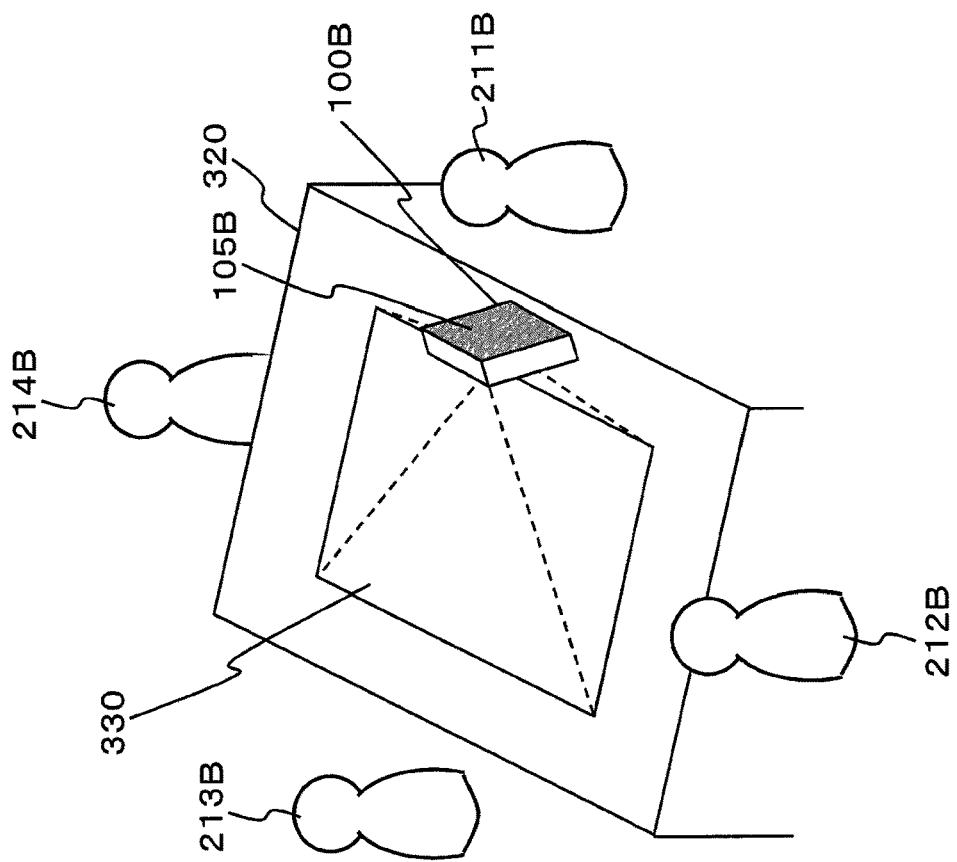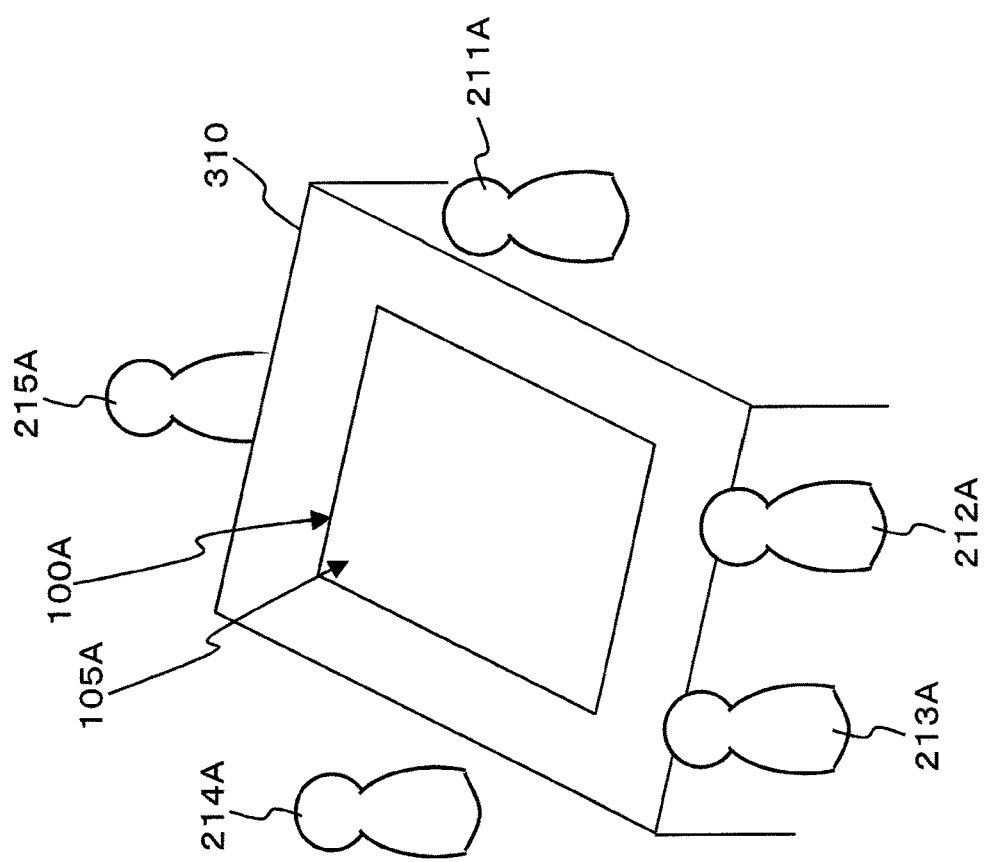

FIG. 5

| STICKY NOTE ID 510 | BOARD ID 512 | POSITION ADDED 515 | SIZE 520 | DATE CREATED 525 | CREATOR 530 | DATE ADDED 535 | COLOR 540 |
|---|---|---|---|---|---|---|---|
| F0001 | D0001 | (100, 200) | (10, 5) | | KF | | |

| LINE TYPE 545 | LINE COLOR 550 | LINE THICKNESS 555 | GROUP 560 | CONTENT TYPE 565 | CONTENT 570 |
|---|---|---|---|---|---|
| | | | | TEXT | |

| STROKE ID | DATE | START POINT X COORDINATE | START POINT Y COORDINATE | END POINT X COORDINATE | END POINT Y COORDINATE |
|---|---|---|---|---|---|
| | | | | | |

Figure 14:
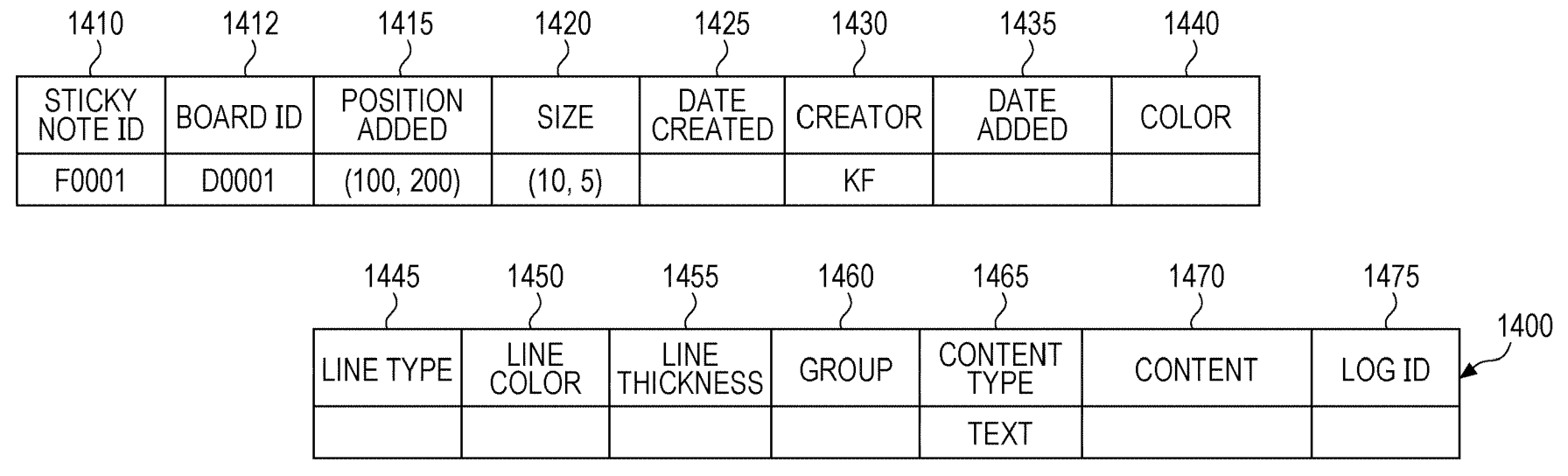

| 1410 | 1412 | 1415 | 1420 | 1425 | 1430 | 1435 | 1440 |
|---|---|---|---|---|---|---|---|
| STICKY NOTE ID | BOARD ID | POSITION ADDED | SIZE | DATE CREATED | CREATOR | DATE ADDED | COLOR |
| F0001 | D0001 | (100, 200) | (10, 5) | | KF | | |

| 1445 | 1450 | 1455 | 1460 | 1465 | 1470 | 1475 |
|---|---|---|---|---|---|---|
| LINE TYPE | LINE COLOR | LINE THICKNESS | GROUP | CONTENT TYPE | CONTENT | LOG ID |
| | | | | TEXT | | |

1400

| LOG ID | STICKY NOTE ID | DATE CORRECTED | CORRECTOR | CONTENT OF CORRECTION |
|--------|----------------|----------------|-----------|----------------------|
|        |                |                |           |                      |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-227766 filed Dec. 5, 2018.

BACKGROUND

(i) Technical Field

The present disclosure relates to an information processing apparatus and a non-transitory computer readable medium.

(ii) Related Art

Japanese Unexamined Patent Application Publication No. 2016-071857 discloses the following information processing apparatus to provide a function of easily recording the content concerning an image. The information processing apparatus can communicate with a storage device storing images and includes an annotation adder and an input information adder. The annotation adder adds an annotation and identification information for identifying this annotation to an image in accordance with a user operation. When an annotation and identification information are added by the annotation adder, the input information adder adds input information including the identification information into an input field in which a user can optionally input information.

Japanese Unexamined Patent Application Publication No. 2013-122529 discloses the following display device that can dispose an on-screen display (OSD) at a suitable position for a user without blocking image data viewed by the user when items of image data received via a network are displayed in individual regions of a display. The display device includes a camera, an image detector, and a display position calculator. The camera captures an image of a user viewing the screen of the display. The image detector analyzes data obtained by capturing the image of the user so as to detect the position and gazing direction of the user. Based on the detected position and gazing direction, the image detector determines a region on the screen of the display that the gaze line directs, and extracts a specific portion, such as a face, of the user from image data concerning the determined region. The display position calculator calculates a display position of an OSD at which the OSD does not overlap the position of the extracted specific portion. The display displays the OSD at the calculated display position.

SUMMARY

While having a discussion in a meeting, for example, users may add sticky notes to a paper board. In a digital sticky-note system, a digital board is displayed on a large screen and digital sticky notes are added to the digital board. Typically, the screen is vertically placed on the floor. In this case, each user generates a sticky note on its own terminal, and a facilitator takes charge of adding sticky notes to the board all by itself. The screen may alternatively be placed horizontally on the floor. In this case, each user may generate a sticky note on the board displayed on the screen. Since the users are located around the horizontally placed screen, the orientation of a generated sticky note does not necessarily match that of the board displayed on the screen. That is, when the posture of a user does not match that of a horizontal screen (board), it is difficult for the user to work on an image displayed on the horizontal screen.

Aspects of non-limiting embodiments of the present disclosure relate to an information processing apparatus and a non-transitory computer readable medium in which, when an image is displayed on a horizontal screen and is corrected by a user, the corrected image can be added to the horizontal screen such that the orientation of the image is adjusted to that of the horizontal screen.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a display controller, a detector, a corrector, and an adder. The display controller performs control to display an image on a horizontal screen. The detector detects a position of a user. The corrector corrects an image in accordance with an operation performed on the horizontal screen by a user. The adder adds the image corrected by the corrector to the horizontal screen in accordance with the position of the user and an orientation of the horizontal screen.

BRIEF DESCRIPTION OF THE DRAWINGS

Exemplary embodiments of the present disclosure will be described in detail based on the following figures, wherein:

FIG. 1 is a block diagram illustrating conceptual modules forming an example of the configuration of a first exemplary embodiment;

FIG. 2 illustrates an example of the system configuration utilizing the exemplary embodiments;

FIGS. 3A and 3B illustrate implementation examples of a horizontal screen in a meeting room, for example, used in the exemplary embodiments;

FIG. 5 illustrates an example of the data structure of a sticky-note information table;

FIG. 10 illustrates an example of the data structure of a stroke table;

FIG. 14 illustrates an example of the data structure of a sticky-note information table;

DETAILED DESCRIPTION

Figure 4:
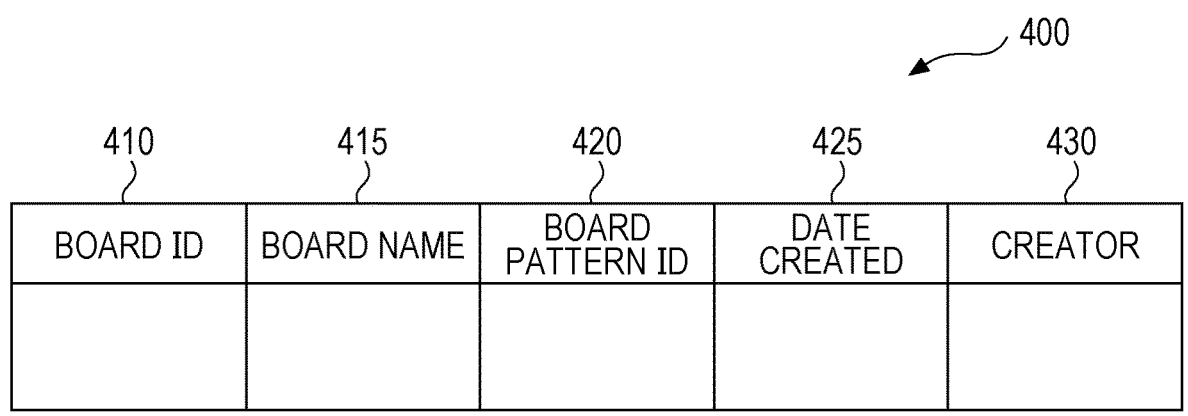
FIG. 4 illustrates an example of the data structure of a board information table.

Exemplary embodiments of the disclosure will be described below with reference to the accompanying drawings.

First Exemplary Embodiment

FIG. 1 is a block diagram illustrating conceptual modules forming an example of the configuration of a first exemplary embodiment.

Generally, modules are software (computer programs) components or hardware components that can be logically separated from one another. The modules of the exemplary embodiments of the disclosure are, not only modules of a computer program, but also modules of a hardware configuration. Thus, the exemplary embodiments will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiments relate to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, login, etc.). The term "predetermined" means being determined prior to a certain operation, and includes the meaning of being determined prior to a certain operation before starting processing of the exemplary embodiments, and also includes the meaning of being determined prior to a certain operation even after starting processing of the exemplary embodiments, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus may be implemented by connecting plural computers, hardware units, devices, etc., to one another via a communication medium, such as a network (including communication connection based on a one-to-one correspondence), or may be implemented by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk, a random access memory (RAM), an external storage medium, a storage device using a communication line, and a register within a central processing unit (CPU).

An information processing apparatus 100 according to the first exemplary embodiment allows a user attending a meeting, for example, (hereinafter simply called a user) to correct an image displayed on a horizontal screen. As shown in FIG. 1, the information processing apparatus 100 includes a display device 105, a display control module 110, a board/sticky-note management module 125, a sticky-note generating module 130, and an image adding module 135. The information processing apparatus 100 is used in a digital sticky-note system (also called a digital whiteboard) using a board and digital sticky notes (an example of images), for example.

The horizontal screen may not necessarily be exactly horizontal and may be somewhat inclined with respect to the horizontal direction. That is, the horizontal screen may be inclined if it allows users to get together around the horizontal screen. The horizontal screen may be a display device, such as a liquid crystal display or an organic electroluminescence (EL) display, built in a table (display-built-in table) or a table having a horizontal surface (screen) on which an image is projected by a projector. In this specification, "horizontal" refers to that the level of the front side of a screen is substantially the same level as the ground. Details of the horizontal screen will be discussed later with reference to FIGS. 3A and 3B.

Users attend a meeting, such as a business meeting, a workshop, a brainstorming session, a study meeting, a seminar, a discussion meeting, or an assembly meeting, by using the information processing apparatus 100 of the first exemplary embodiment.

The display device 105 is connected to the display control module 110. The display device 105 is a horizontal screen and displays an image under the control of the display control module 110. In a typical example, users get together around the display device 105 and use it during a meeting. The display device 105 is thus desirably a large screen.

The display control module 110 includes a sticky-note display control module 115 and a board display control module 120. The display control module 110 is connected to the display device 105, the board/sticky-note management module 125, and the image adding module 135. The display control module 110 controls the display content to be displayed on the display device 105. For example, the display control module 110 performs control to display a board and a sticky note on the display device 105.

The sticky-note display control module 115 performs control to display an image on the display device 105, which is a horizontal screen.

An image is an image displayed on the horizontal screen. Examples of the image are still images and video images, such as characters, drawings, and photos. A sticky note (digital sticky note) will be discussed below as an example of the image. In the case of a sticky note, a board is displayed on the horizontal screen, and the orientation of the board is the orientation of the horizontal screen. If the image is a sticky note, the orientation of the board may be synonymously read as the orientation of the horizontal screen. The orientation (top, bottom, right, and left) of the horizontal screen may be determined as desired. For example, among users, a leader may determine the top side of the horizontal screen. For example, the leader determines the side on which more users are located as the bottom side of the horizontal screen.

The board display control module 120 performs control to display a board on the display device 105.

The board/sticky-note management module 125 is connected to the display control module 110 and the image adding module 135. The board/sticky-note management module 125 manages a board and an image to be displayed on the display device 105. For example, the board/sticky-note management module 125 has a board information table 400 and a sticky-note information table 500, which will be discussed later.

The sticky-note generating module 130 is connected to the image adding module 135. The sticky-note generating module 130 corrects an image in accordance with a user operation performed on the horizontal screen.

Generating of an image is to generate a new image in accordance with a user operation. Accordingly, generating of an image does not include selecting of a predetermined image, such as a card in a card game.

Correcting of an image includes writing of characters and drawings in a blank image, in addition to correcting (such as adding, changing, modifying, revising, and deleting) of the content of an image. Correcting of an image may include generating of an image.

The image adding module 135 includes a detecting module 140 and a rotating module 145. The image adding module 135 is connected to the display control module 110, the board/sticky-note management module 125, and the sticky-note generating module 130. The image adding module 135 adds an image corrected by the sticky-note generating module 130 to the horizontal screen in accordance with the position of a user detected by the detecting module 140 and the orientation of the horizontal screen.

The detecting module 140 detects the position of a user. The detecting module 140 may capture an image of a user with a camera (may alternatively be an infrared sensor) so as to detect the position of the user with respect to the horizontal screen. The detecting module 140 may alternatively detect the position of a finger of a user, for example, touching the horizontal screen. In this case, a touchscreen is used for the display device 105. With the use of a camera, the detecting module 140 may particularly detect the position of a user shifting its hand.

The detecting module 140 may detect the orientation of an image.

The detecting module 140 may detect the orientation of an image in accordance with the orientation of written characters.

The detecting module 140 may detect the orientation of written characters by using the direction of handwriting of the characters.

The detecting module 140 may detect the orientation of written characters by using the stroke order of the characters.

The detecting module 140 may identify a character and detect the orientation of an image in accordance with the direction in which the subsequent character follows.

The detecting module 140 may detect the orientation of an image in accordance with the position at which a user has performed an operation on the horizontal screen. In this case, the detecting module 140 may detect the orientation of the image also by comparing the horizontal length and the vertical length of the image. The detecting module 140 may detect the orientation of the image also in accordance with an operation for generating borders of the image.

The rotating module 145 rotates an image so as to adjust the orientation of the image detected by the detecting module 140 to that of the board.

If a sticky note is used as an image and a board is displayed on the horizontal screen, the above-described modules may execute the following processing. The information processing apparatus 100 displays a board and a sticky note on the horizontal screen, and a sticky note is generated on the board by a user. In this case, the sticky note can be added to the horizontal screen such that the orientation of the sticky note is adjusted to that of the board.

The display control module 110 performs control to display a board and a sticky note on the display device 105, which is the horizontal screen.

The sticky-note generating module 130 generates a sticky note in accordance with a user operation performed on the display device 105.

The image adding module 135 adds a sticky note generated by the sticky-note generating module 130 to the board in accordance with the orientation of the board.

Adding processing performed by the image adding module 135 is constituted by rotating processing and shifting processing. Regarding shifting processing, the image adding module 135 may shift a sticky note to a certain position on the board in accordance with a user operation, or may shift a sticky note to a predetermined position, such as a fixed position for a new sticky note or a position determined in accordance with the generating order of sticky notes. Rotating processing will be discussed later.

The detecting module 140 detects the orientation of a sticky note.

The rotating module 145 rotates a sticky note so as to adjust the orientation of the sticky note to that of the board.

The detecting module 140 may detect the orientation of a sticky note in accordance with the orientation of written characters.

The detecting module 140 may detect the orientation of written characters by using the direction of handwriting of the characters.

The detecting module 140 may detect the orientation of written characters by using the stroke order of the characters.

The detecting module 140 may identify a character and detect the orientation of a sticky note in accordance with the direction in which the subsequent character follows.

The detecting module 140 may detect the orientation of a sticky note by determining which side of the board close to an operating position of a user.

More specifically, the orientation of a sticky note is determined in the following manner, for example.

(1) If the operating position of a user is close to the bottom side of the board, the orientation of a sticky note is the same as that of the board, and the sticky note does not need rotating.

(2) If the operating position of a user is close to the right side of the board, the orientation of a sticky note is 270 degrees with respect to that of the board (nine o'clock in clock position), and the sticky note is rotated by 90 degrees to the right.

(3) If the operating position of a user is close to the top side of the board, the orientation of a sticky note is opposite that of the board, and the sticky note is rotated by 180 degrees.

(4) If the operating position of a user is close to the left side of the board, the orientation of a sticky note is 90 degrees with respect to that of the board (three o'clock in clock position), and the sticky note is rotated by 90 degrees to the left.

The detecting module 140 may detect the orientation of a sticky note also by comparing the horizontal length and the vertical length of the sticky note.

If the orientation of a sticky note is detected by determining which side of the board close to an operating position of a user, it may not be possible to make this determination if the operating position of the user is close to one of the four corners of the board. For example, if the operating position is close to the bottom right corner, it may not possible to determine whether the operating position is close to the right side or the bottom side of the board. In this case, as a result of comparing the horizontal length and the vertical length of the sticky note, the orientation of the sticky note is detected. More specifically, assuming that a sticky note is oriented horizontally (landscape), if the horizontal length is longer than the vertical length, the operating position (bottom right corner) of the user is found to be close to the bottom side of the board, and if the vertical length is longer than the horizontal length, the operating position (bottom right corner) of the user is found to be close to the right side of the board.

The orientation of a sticky note may be detected also in accordance with the orientation of written characters.

The detecting module 140 may detect the orientation of a sticky note in accordance with an operation for generating borders of the sticky note.

If borders of a sticky note are generated by setting a top left corner first and then setting a bottom right corner, the orientation of the sticky note is determined in the following manner, for example.

(1) If the setting direction is from the top left to the bottom right on the board, the sticky note is found to be close to the bottom side of the board.

(2) If the setting direction is from the bottom left to the top right on the board, the sticky note is found to be close to the right side of the board.

(3) If the setting direction is from the bottom right to the top left on the board, the sticky note is found to be close to the top side of the board.

(4) If the setting direction is from the top right to the bottom left on the board, the sticky note is found to be close to the left side of the board.

FIG. 2 illustrates an example of the system configuration utilizing the exemplary embodiments.

In a meeting room 200A, an information processing apparatus 100A is installed. Users 211A through 215A are in the meeting room 200A and are holding a meeting by using sticky notes.

In a meeting room 200B, an information processing apparatus 100B is installed. Users 211B through 214B are in the meeting room 200B and are holding a meeting by using sticky notes.

Hereinafter, when referring to the information processing apparatuses 100 in general, they may collectively be called the information processing apparatus 100 unless it is necessary to individually distinguish them from each other.

The information processing apparatus 100A within the meeting room 200A, the information processing apparatus 100B within the meeting room 200B, and a board/sticky-note management module 250 are connected to one another via a communication line 290. The board/sticky-note management module 250 manages a board and sticky notes to be used in each meeting (or each group), and supplies a board and sticky notes required for a meeting to the board/sticky-note management module 125 of each information processing apparatus 100. The board/sticky-note management module 250 may store the results of each meeting (the content of the board and sticky notes at the end of a meeting). The communication line 290 may be a wireless or wired medium, or a combination thereof, and may be, for example, the Internet or an intranet as a communication infrastructure. The functions of the board/sticky-note management module 250 and the information processing apparatus 100 may be implemented as cloud services.

To implement a sticky-note system, as a shared screen on which a board and sticky notes are displayed, a horizontal screen or a vertical screen may be used. The vertical screen is an existing screen and may be used as a whiteboard. Unlike the vertical screen, users can be close to the horizontal screen. That is, while only one user (ambassador, for example) can usually operate the vertical screen, plural users can get around the horizontal screen and directly operate it to add a sticky note to the board. In the case of the vertical screen, users stay at fixed positions (sitting on chairs, for example) in a meeting, while, in the case of the horizontal screen, users get around the screen and move as they like and do not stay at the same position. With the use of a user interface which allows users to directly operate the horizontal screen, the posture of a user does not necessarily match the orientation of the horizontal screen (board), and the user may find it difficult to operate the board and write down on a sticky note. In the exemplary embodiments, a user is able to easily write down on a sticky note when correcting it (including generating a new one), and the corrected sticky note is added to the board such that the orientation of the sticky note is adjusted to that of the board.

FIGS. 3A and 3B illustrate implementation examples of a horizontal screen in a meeting room, for example, used in the exemplary embodiments.

A display-built-in table 310 shown in FIG. 3A contains the information processing apparatus 100A. A display device 105A (also called a digital board), such as a liquid crystal display, is built in the upper plate of the display-built-in table 310 so as to form a horizontal screen. The display device 105A usually has a large screen of about 80 inches, for example, and displays a board and sticky notes. The display device 105A is a touchscreen and detects the position and the pressure of a finger or a pen, for example, touching the screen. Each user (user 211A, for example) creates a sticky note on the display device 105A and adds it to a board displayed on the display device 105A. The users have a discussion by looking at sticky notes added to the board.

A display device 105B of the information processing apparatus 100B shown in the example in FIG. 3B is a projector installed on a table 320. The upper plate of the table 320 is also used as a screen 330. On the screen 330, images (board and sticky notes) projected by the display device 105B are displayed. The display device 105B has the function of making keystone correction on images projected on the screen 330, which is the projecting surface. Instead of installing the display device 105B on the table 320, it may be fixed on the ceiling above the table 320.

The screen 330, which also serves as a digital whiteboard, detects the movement of a finger of a user (user 211B, for example) or a pen so as to receive an operation for adding or shifting a sticky note. For example, a pen is kept in a predetermined pen holder on the table 320. The screen 330 detects that the pen is removed from the pen holder, that is, the user 211B, for example, has lifted the pen, and that the pen tip has touched the screen 330 (the position of the pen tip on the screen 330) so as to receive an operation performed by the user 211B on a board or a sticky note. For example, plural pens (such as black, red, and blue pens) are kept in the pen holder, and a sensor, which is turned ON and OFF in accordance with the gravity of a pen, is integrated in the pen holder to detect which one of the plural pens is being used. The screen 330 is a touch sensor and detects the position and the pressure of a pen touching the display screen. In this example, the pen is turned ON and OFF under the control of the pen holder. However, the provision of the pen holder may be omitted, in which case, the pen may be ON and OFF by itself. In this example, plural pens having different colors are kept in the pen holder. However, only a single pen may be provided and the color of the pen may be changed as follows. A color palette is provided on part of the display screen, and the pen (or an object similar to a pen) touches a desired color so as to change the color of the pen. Alternatively, the pen may be provided with a function (such as a button or a slider) of giving an instruction to change the color.

FIG. 4 illustrates an example of the data structure of the board information table 400. The board information table 400 has a board ID field 410, a board name field 415, a board pattern ID field 420, a created date field 425, and a creator field 430. The board ID field 410 stores information (board ID) for uniquely identifying a board in the first exemplary embodiment. The board name field 415 stores the name of the board having this board ID. The board pattern ID field 420 stores the board pattern ID of the board pattern of this board used as a background. Examples of the board patterns are a blank pattern, a tabular form pattern, and a pattern including reserved areas where sticky notes for describing legends are placed. The created date field 425 indicates the time and date (year, month, day, hour, minute, second, millisecond, or a combination thereof) at and on which the board is created. The creator field 430 indicates the creator of the board. The board information table 400 is managed by the board/sticky-note management module 125.

FIG. 5 illustrates an example of the data structure of the sticky-note information table 500. The sticky-note information table 500 has a sticky note ID field 510, a board ID field 512, an added position field 515, a size field 520, a created date field 525, a creator field 530, an added date field 535, a color field 540, a line type field 545, a line color field 550, a line thickness field 555, a group field 560, a content type field 565, and a content field 570. The sticky note ID field 510 stores information (sticky note ID) for uniquely identifying a sticky note in the first exemplary embodiment. The board ID field 512 stores the board ID of the board to which this sticky note is added. The added position field 515 indicates the position of the sticky note added to the board, which is represented by the coordinates on the XY coordinate system of the board, for example. The size field 520 indicates the size of the sticky note. If the sticky note is rectangular, for example, the width and the height of the sticky note are indicated as the size. The created date field 525 indicates the time and date at and on which the sticky note is created. The creator field 530 indicates the creator (user ID) of the sticky note. The creator field 530 may alternatively indicate an information processing apparatus (device ID of the information processing apparatus 100) that has created the sticky note. The added date field 535 indicates the time and date at and on which the sticky note is added to the board. The color field 540 indicates the display color of the sticky note. The line type field 545 indicates the line type (such as a solid line, a dotted line, a broken line, a wavy line, and double lines) of the displayed sticky note. The line color field 550 indicates the color of the line of the displayed sticky note. The line thickness field 555 indicates the thickness of the line of the displayed sticky note. The group field 560 stores information concerning a group of the sticky note. The group field 560 may store information indicating whether the sticky note belongs to a group, and if it belongs to a group, the group field 560 may store the group ID of this group or the ID of another sticky note belonging to this group. The content type field 565 indicates the content type of sticky note, such as text information, vector data indicating an object such as handwritten characters or a drawing, voice information, still image information such as a photo, video information, or information indicating a combination thereof. The content field 570 stores the content of the sticky note. The sticky-note information table 500 is managed by the board/sticky-note management module 125.

Figure 6:
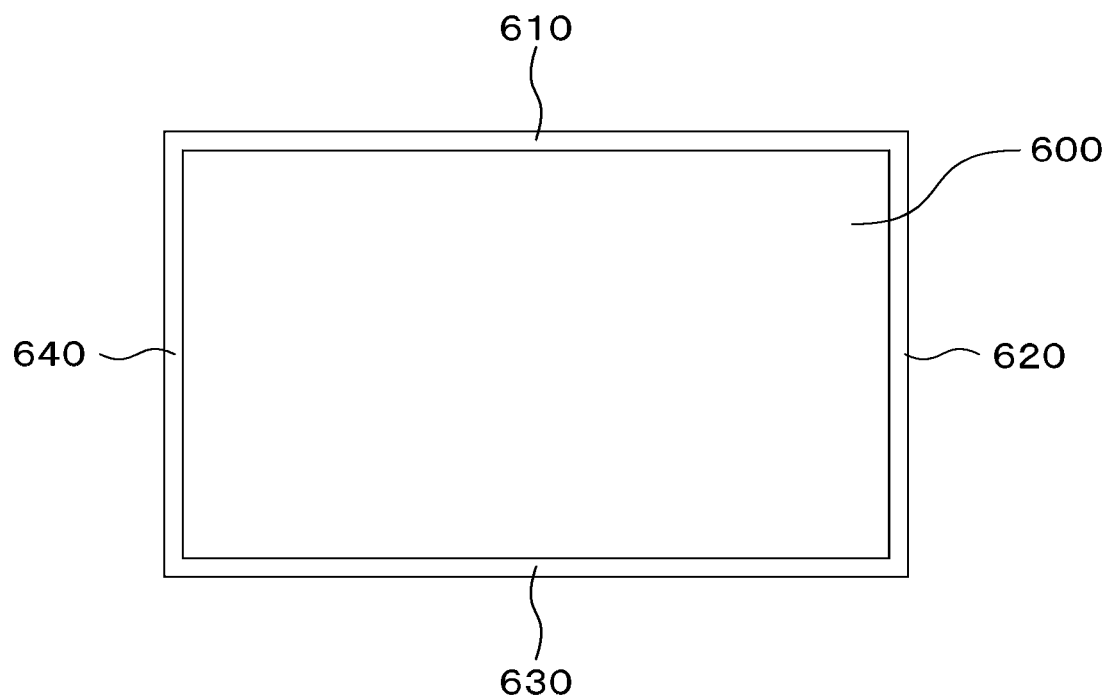
FIG. 6 illustrates examples of the sides of a board.

FIG. 6 illustrates examples of the sides of a board 600. The board 600 has a top side 610, a right side 620, a bottom side 630, and a left side 640. The top, bottom, right, and left sides of the board 600 may be determined in accordance with the position of a user (user 211A, for example) viewing the board 600. However, a predetermined side is set as the top side of the board 600 and a sticky note is added to the board 600 so that it is legible. The top side may be changed in the course of a meeting, that is, the board and sticky notes may be rotated.

Figure 7:
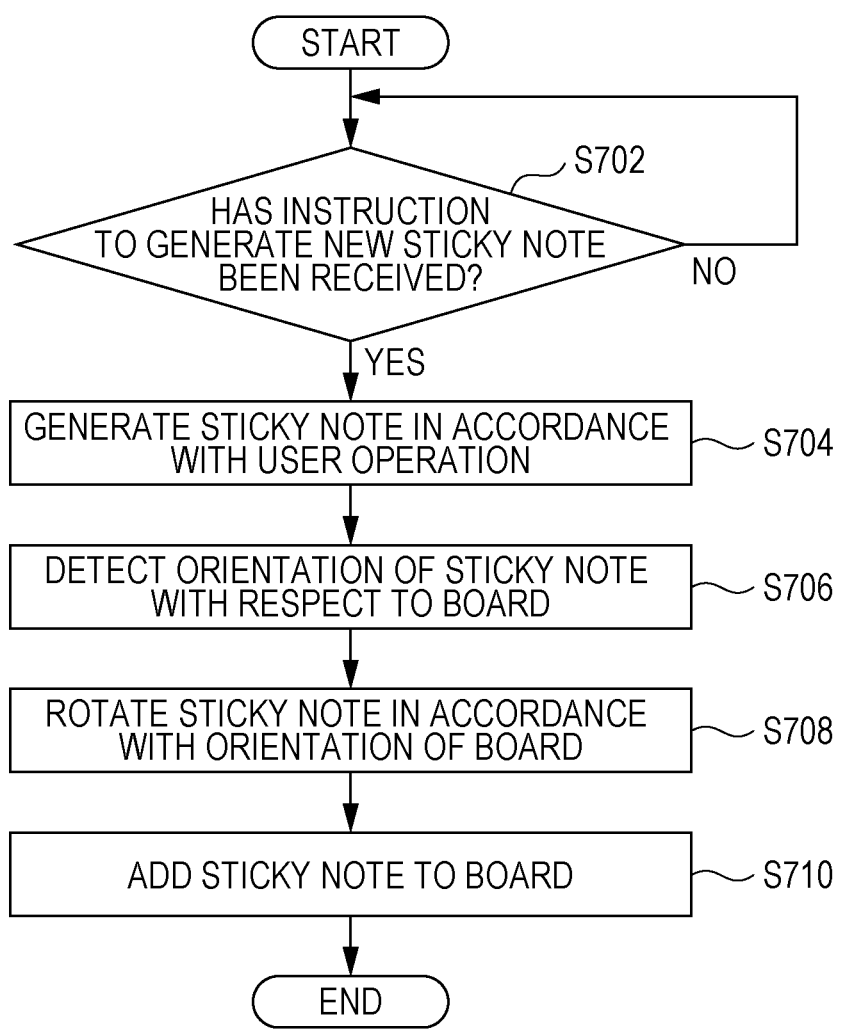
FIG. 7 is a flowchart illustrating an example of processing executed by the first exemplary embodiment.

FIG. 7 is a flowchart illustrating an example of processing executed by the first exemplary embodiment.

In step S702, it is judged whether an instruction to generate a new sticky note has been received. If such an instruction has been received, the process proceeds to step S704. If such an instruction has not been received, the process waits until an instruction is received. For example, when an operation, such as double-tapping on the board 600, displaying a menu on the board 600 and selecting a "generate a new sticky note" command, or drawing borders of a sticky note on the board 600 (see FIG. 12), is performed, it is determined that an instruction to generate a new sticky note has been received.

In step S704, the sticky-note generating module 130 generates a sticky note in accordance with a user operation. For example, the sticky-note generating module 130 generates a blank sticky note and then writes the content of the sticky note.

In step S706, the detecting module 140 detects the orientation of the sticky note with respect to the board. This will be discussed later with reference to FIGS. 8 through 12.

In step S708, the rotating module 145 rotates the sticky note in accordance with the orientation of the board.

In step S710, the image adding module 135 adds the sticky note to the board.

Figure 8:
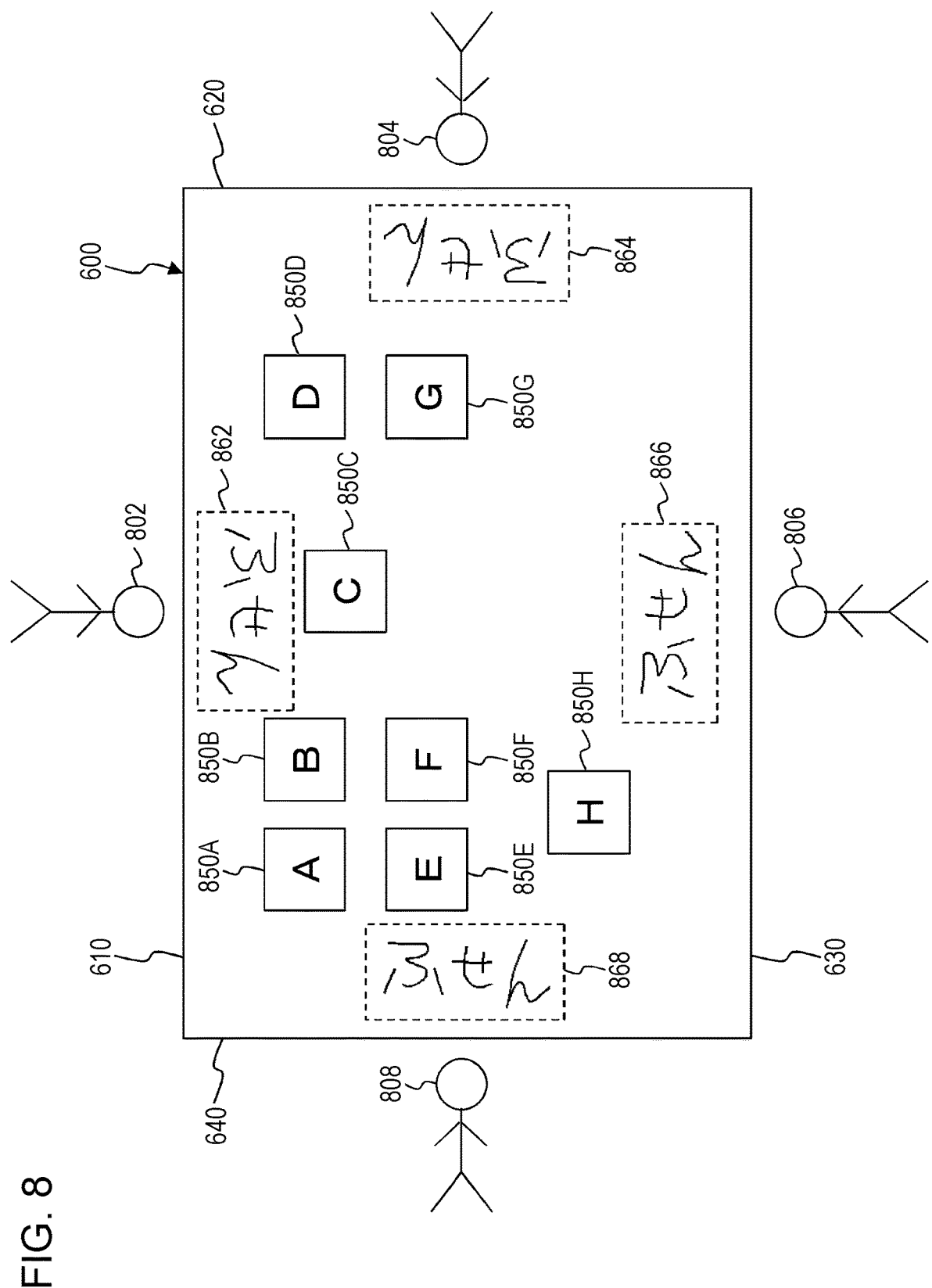
FIG. 8 illustrates an example of processing executed by the first exemplary embodiment.

FIG. 8 illustrates an example of processing executed by the first exemplary embodiment.

Sticky notes 850A through 850H are already added to the board 600.

Users 802, 804, 806, and 808 get together around the board 600 and are having a meeting. Each user is generating a sticky note and adding it to the board 600. The users 802 through 808 are generating a sticky note while facing the corresponding sides of the board 600, as shown in FIG. 8. A region 866 where a new sticky note generated by the user 806 near the bottom side 630 is added matches the orientation of the board 600. However, a region 864 where a new sticky note generated by the user 804 near the right side 620 is added, a region 862 where a new sticky note generated by the user 802 near the top side 610 is added, and a region 868 where a new sticky note generated by the user 808 near the left side 640 is added do not match the orientation of the board 600. It is not desirable to add the sticky notes to the board 600 without changing the orientations. Thus, the orientation of each sticky note is detected in accordance with the position or the operation of the corresponding user. Then, when adding a sticky note to the board 600, it is rotated so that the orientation of the sticky note is adjusted to that of the board 600.

Figure 9:
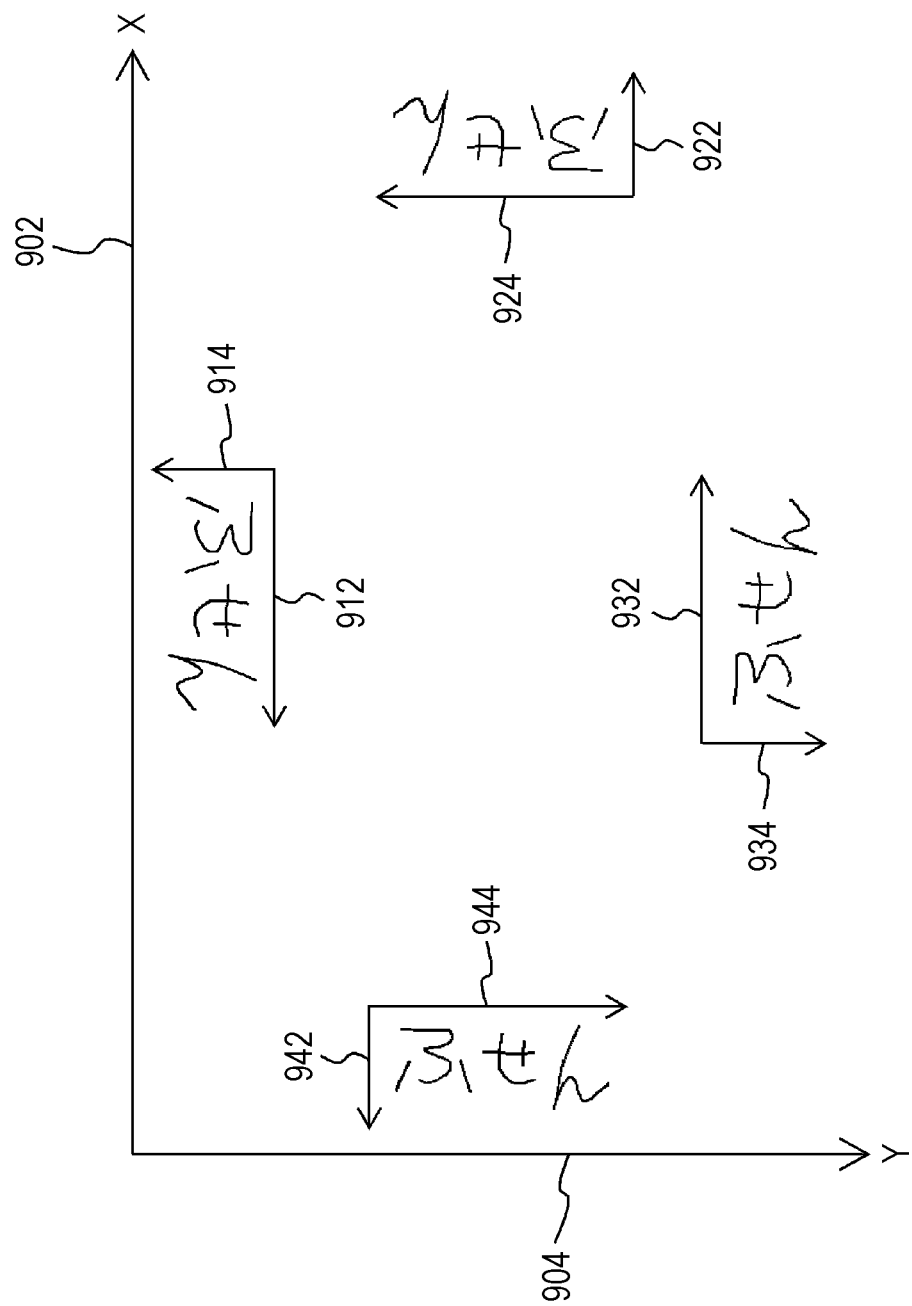
FIG. 9 illustrates an example of processing executed by the first exemplary embodiment.

FIG. 9 illustrates an example of processing executed by the first exemplary embodiment.

On the board 600, a plane is defined by an X axis 902 and a Y axis 904. The orientation of the content written in a sticky note is extracted. If characters are written into the sticky note, the strokes of handwritten characters, for example, are extracted. Data concerning each stroke written into a sticky note by a user is expressed in the format of a stroke table 1000.

FIG. 10 illustrates an example of the data structure of the stroke table 1000. The stroke table 1000 has a stroke ID field 1010, a date field 1015, a start point X coordinate field 1020, a start point Y coordinate field 1025, an end point X coordinate field 1030, and an end point Y coordinate field 1035. The stroke ID field 1010 stores information (stroke ID) for uniquely identifying a stroke in the first exemplary embodiment. The date field 1015 indicates the time and date (year, month, day, hour, minute, second, millisecond, or a combination thereof) at and on which the stroke is generated. The start point X coordinate field 1020 indicates the X coordinate (X coordinate on the board 600) at the start point. The start point Y coordinate field 1025 indicates the Y coordinate (Y coordinate on the board 600) at the start point. The end point X coordinate field 1030 indicates the X coordinate (X coordinate on the board 600) at the end point. The end point Y coordinate field 1035 indicates the Y coordinate (Y coordinate on the board 600) at the end point. That is, each stroke is defined by the coordinates at the start point and the coordinates at the end point.

Then, the accumulative number of strokes in each orientation is calculated. Usually, there are more left-to-right strokes and top-to-bottom strokes than right-to-left strokes and bottom-to-top strokes. The x axis and the y axis of each sticky note are determined based on this assumption. That is, among the four orientations (upward, downward, rightward, and leftward), a largest number of strokes in one of the orientations are set to be left-to-right strokes. Then, a second largest number of strokes in another one of the orientations are set to be top-to-bottom strokes. Then, the x axis and the y axis of each sticky note are determined. In the region 866 shown in FIG. 8, the x axis and the y axis of the sticky note are determined to be an x axis 932 and a y axis 934, as indicated in the bottom section of FIG. 9. In the region 864 shown in FIG. 8, the x axis and the y axis of the sticky note are determined to be an x axis 922 and a y axis 924, as indicated in the right section of FIG. 9. In the region 862 shown in FIG. 8, the x axis and the y axis of the sticky note are determined to be an x axis 912 and a y axis 914, as indicated in the top section of FIG. 9. In the region 868 shown in FIG. 8, the x axis and the y axis of the sticky note are determined to be an x axis 942 and a y axis 944, as indicated in the left section of FIG. 9. Accordingly, with respect to the orientation of the board 600, the orientation of the region 866 is an erect position, the orientation of the region 864 is at 270 degrees, the orientation of the region 862 is at 180 degrees (vertically inverted), and the orientation of the region 868 is at 90 degrees. When adding the generated sticky notes to the board 600, the orientations of the regions 862 through 868 are adjusted to the orientation of the board 600. More specifically, the region 866 is not rotated or is rotated by 0 degrees, the region 864 is rotated by 90 degrees to the right, the region 862 is rotated by 180 degrees, and the region 868 is rotated by 90 degrees to the left.

The orientation of written characters may be detected by using the stroke order of the characters. For example, in the case of Kanji (Chinese characters), Hiragana (Japanese phonetic syllabary), and Katakana (Japanese phonetic syllabary), to express part of a character in the shape of a cross, for example, a user usually draws a horizontal line from left to right first and then a vertical line from top to bottom. Based on this assumption, when crossing strokes are found, it is determined that the first stroke is written from left to right and the second stroke is written from top to bottom. The orientation of the sticky note is then determined based on the directions of these strokes.

A character may be identified, and the orientation of a sticky note may be detected in accordance with the direction in which the subsequent character follows. To identify a character and determine the direction of the subsequent character, online character recognition technique may be used. It may be determined that a character is identified when a character extends to outside a predetermined region (region for one character). Alternatively, if nothing has been written for a predetermined time, it may be determined that a character is identified. The direction of the subsequent character with respect to the identified character is the direction in which the subsequent character follows.

Figure 11:
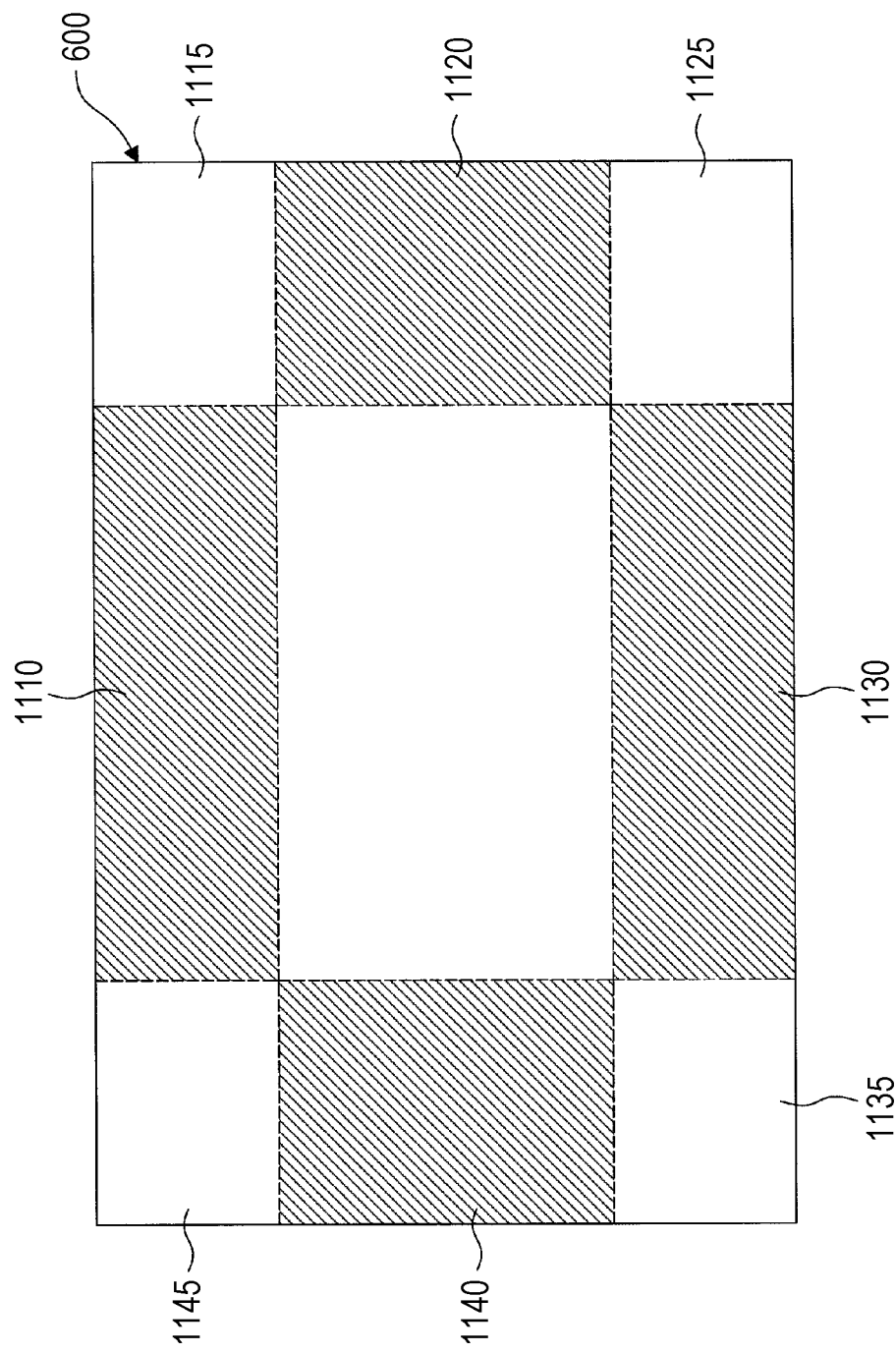
FIG. 11 illustrates examples of regions within a board.

FIG. 11 illustrates an example of regions within the board 600.

In the above-described example, the orientation of a sticky note is detected only by the position of the content of the sticky note (that is, the position of a user). However, if the position of a sticky note is one of the four corners of the board 600, it may be difficult to determine the orientation of the sticky note. That is, when the position of a sticky note is one of a top right region 1115, a bottom right region 1125, a bottom left region 1135, and a top left region 1145, a correct orientation of the sticky note may not be obtained if the position of the sticky note is unconditionally determined to be the top, right, bottom, or left side of the board 600.

To address the above-described issue, the board 600 is divided into a top side region 1110, the top right region 1115, a right side region 1120, the bottom right region 1125, a bottom side region 1130, the bottom left region 1135, a left side region 1140, and the top left region 1145. If the position of a sticky note is in the top side region 1110, it is rotated by 180 degrees. If the position of a sticky note is in the right side region 1120, it is rotated by 90 degrees to the right. If the position of a sticky note is in the bottom side region 1130, it is rotated by 0 degrees. If the position of a sticky note is in the left side region 1140, it is rotated by 90 degrees to the left. If the position of a sticky note is in one of the top right region 1115, the bottom right region 1125, the bottom left region 1135, and the top left region 1145, the orientation of the content written in the sticky note is used described above. In the case of the top right region 1115, it is determined whether the orientation of the sticky note is vertically inverted or at 270 degrees with respect to the orientation of the board 600. In the case of the bottom right region 1125, it is determined whether the orientation of the sticky note is an erect position or at 270 degrees with respect to the orientation of the board 600. In the case of the bottom left region 1135, it is determined whether the orientation of the sticky note is an erect position or at 90 degrees with respect to the orientation of the board 600. In the case of the top left region 1145, it is determined whether the orientation of the sticky note is vertically inverted or at 90 degrees with respect to the orientation of the board 600.

If the position of a sticky note is in one of the top right region 1115, the bottom right region 1125, the bottom left region 1135, and the top left region 1145, the orientation of a sticky note may be determined also by comparing the horizontal length and the vertical length of the sticky note. Usually, a sticky note is oriented horizontally (landscape). As a result of comparing the length in the horizontal direction (X axis in the coordinate plane of the board 600) and the length of the vertical direction (Y axis in the coordinate plane of the board 600) of a sticky note, the sticky note may be rotated so that the longer one can be adjusted to the X axis in the coordinate plane of the board 600. More specifically, if the position of a sticky note is in the top right region 1115 and the vertical length is longer, the sticky note is rotated by 90 degrees to the right. If the position of a sticky note is in the top right region 1115 and the horizontal length is longer, the sticky note is rotated by 180 degrees. If the position of a sticky note is in the bottom right region 1125 and the vertical length is longer, the sticky note is rotated by 90 degrees to the right. If the position of a sticky note is in the bottom right region 1125 and the horizontal length is longer, the sticky note is rotated by 0 degrees. If the position of a sticky note is in the bottom left region 1135 and the vertical length is longer, the sticky note is rotated by 90 degrees to the left. If the position of a sticky note is in the bottom left region 1135 and the horizontal length is longer, the sticky note is rotated by 0 degrees. If the position of a sticky note is in the top left region 1145 and the vertical length is longer, the sticky note is rotated by 90 degrees to the left. If the position of a sticky note is in the top left region 1145 and the horizontal length is longer, the sticky note is rotated by 180 degrees.

Figure 12:
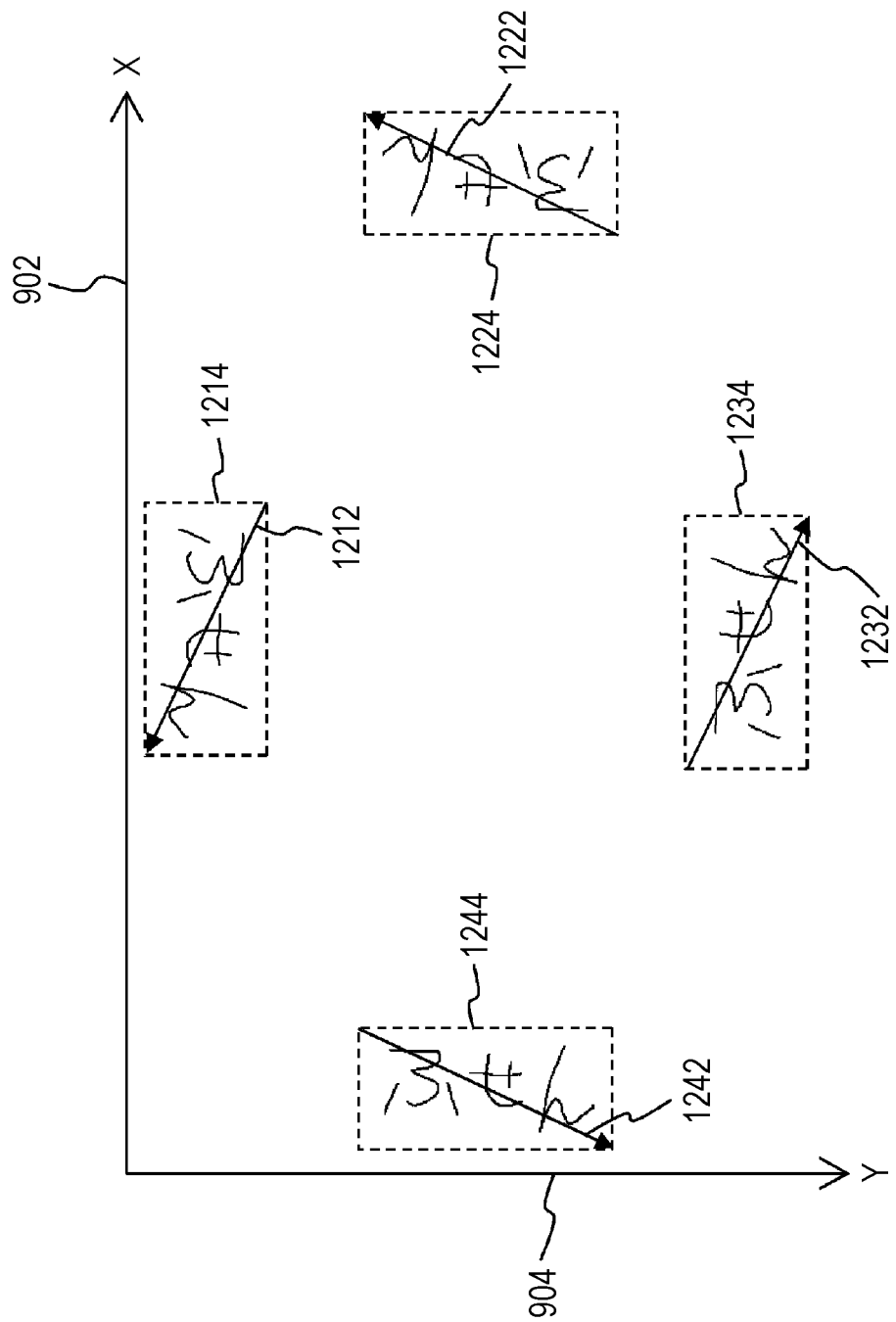
FIG. 12 illustrates an example of processing executed by the first exemplary embodiment.

FIG. 12 illustrates an example of processing executed by the first exemplary embodiment.

More specifically, FIG. 12 illustrates an operation for generating borders of a sticky note. For example, if it is determined that, to generate borders of the sticky note, a user sets a top left corner of a sticky note first and then sets a bottom right corner of the sticky note, the orientation of a sticky note may be determined in accordance with the generating operation for borders of the sticky note. If the generating operation is performed in the direction indicated by an arrow 1212 (that is, shifting operation in the direction from the bottom right to the top left in the plane of the board 600) to generate a new sticky note 1214, the sticky note 1214 is rotated by 180 degrees. If the generating operation is performed in the direction indicated by an arrow 1222 (that is, shifting operation in the direction from the bottom left to the top right in the plane of the board 600) to generate a new sticky note 1224, the sticky note 1224 is rotated by 90 degrees to the right. If the generating operation is performed in the direction indicated by an arrow 1232 (that is, shifting operation in the direction from the top left to the bottom right in the plane of the board 600) to generate a new sticky note 1234, the sticky note 1234 is rotated by 0 degrees. If the generating operation is performed in the direction indicated by an arrow 1242 (that is, shifting operation in the direction from the top right to the bottom left in the plane of the board 600) to generate a new sticky note 1244, the sticky note 1244 is rotated by 90 degrees to the left.

If the position of a sticky note is one of the top right region 1115, the bottom right region 1125, the bottom left region 1135, and the top left region 1145 shown in FIG. 11, the above-described judging processing using the shifting direction of borders of a sticky note may be performed.

Borders of a sticky note may be generated after the content of the sticky note is written. Alternatively, borders a sticky note may be generated first, and then, the content of the sticky note may be written.

Second Exemplary Embodiment

Figure 13:
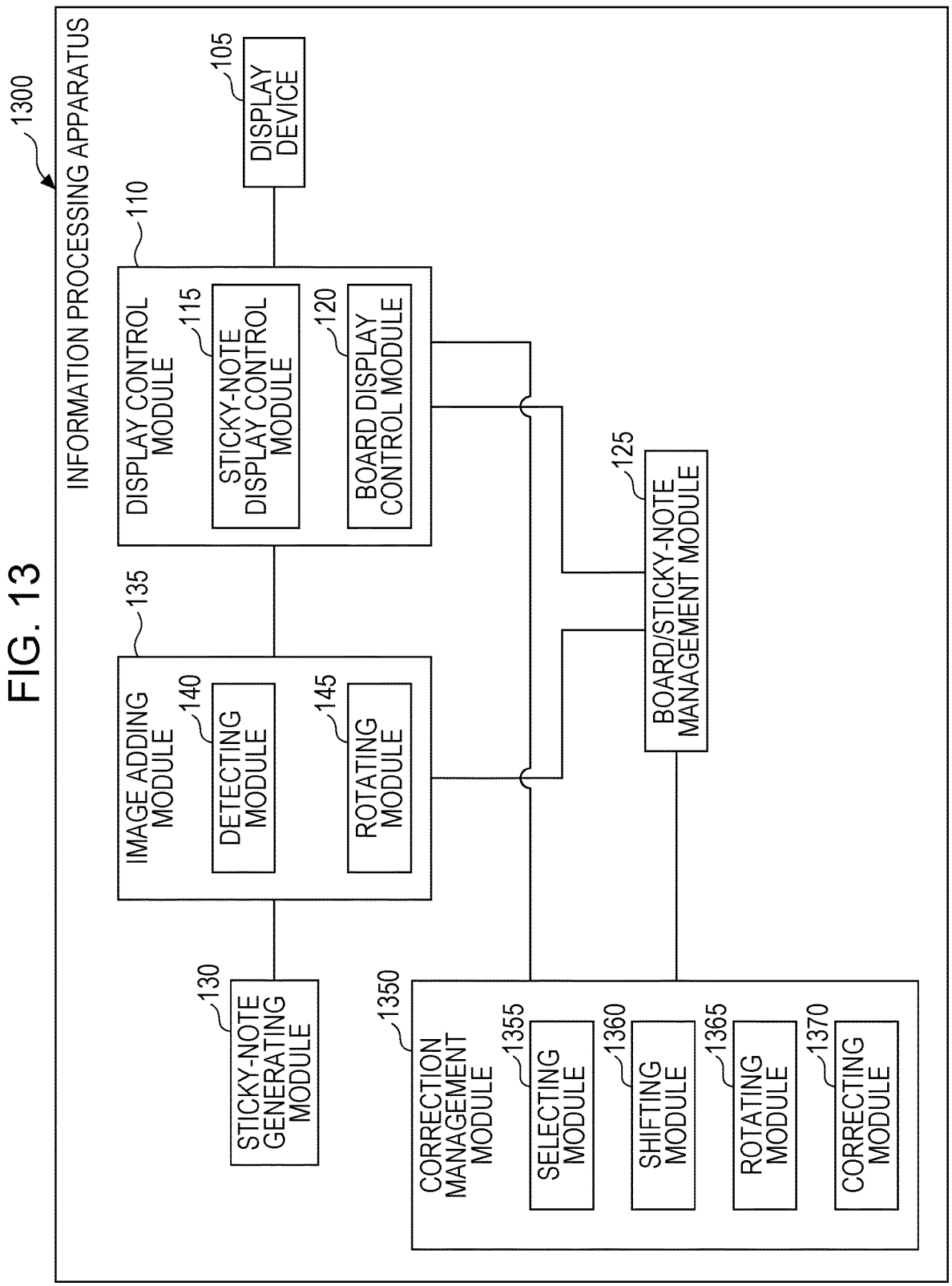
FIG. 13 is a block diagram illustrating conceptual modules forming an example of the configuration of a second exemplary embodiment.

FIG. 13 is a block diagram illustrating conceptual modules forming an example of the configuration of a second exemplary embodiment.

Elements similar to those of the first exemplary embodiment are designed by like reference numerals, and an explanation thereof will not be given.

An information processing apparatus 1300 includes a display device 105, a display control module 110, a board/sticky-note management module 125, a sticky-note generating module 130, an image adding module 135, and a correction management module 1350.

The display device 105 is connected to the display control module 110.

The display control module 110 includes a sticky-note display control module 115 and a board display control module 120. The display control module 110 is connected to the display device 105, the board/sticky-note management module 125, the image adding module 135, and the correction management module 1350. The display control module 110 performs control to display an image on the display device 105, which is a horizontal screen.

The board/sticky-note management module 125 is connected to the display control module 110, the image adding module 135, and the correction management module 1350.

The sticky-note generating module 130 is connected to the image adding module 135.

The image adding module 135 includes a detecting module 140 and a rotating module 145. The image adding module 135 is connected to the display control module 110, the board/sticky-note management module 125, and the sticky-note generating module 130.

The correction management module 1350 includes a selecting module 1355, a shifting module 1360, a rotating module 1365, and a correcting module 1370. The correction management module 1350 is connected to the display control module 110 and the board/sticky-note management module 125.

The selecting module 1355 selects an image to be corrected from among images added to the horizontal screen, in accordance with an operation performed on the horizontal screen by a user.

The shifting module 1360 shifts the image selected by the selecting module 1355 to the position of the user.

When the user has finished rotating an image, the shifting module 1360 may shift the image in accordance with the angle of rotation.

The rotating module 1365 rotates an image selected by the selecting module 1355 so as to enable the user to correct the image.

The rotating module 1365 may rotate an image in accordance with a region to which the shifting module 1360 has shifted the image.

The rotating module 1365 may rotate an image in accordance with a user operation.

The correcting module 1370 corrects an image added to the horizontal screen in accordance with a user operation performed on the horizontal screen.

The image adding module 135 may add an image corrected by the correcting module 1370 to the horizontal screen in accordance with the orientation the horizontal screen.

The image adding module 135 may add an image to the position at which it has been located before it has been corrected.

If a sticky note is used as an image and a board is displayed on the horizontal screen, the above-described modules may execute the following processing.

The display control module 110 performs control to display a board and a sticky note on the display device 105, which is a horizontal screen.

The selecting module 1355 selects a sticky note to be corrected from among sticky notes added to the board, in accordance with an operation performed on the horizontal screen by a user.

The shifting module 1360 shifts the sticky note selected by the selecting module 1355 to the position of the user.

The rotating module 1365 rotates the sticky note selected by the selecting module 1355 so as to enable the user to correct the sticky note.

The rotating module 1365 may rotate a sticky note in the following manner in accordance with a region to which the shifting module 1360 has shifted the sticky note.

(1) If the sticky note has shifted to a region near the bottom side of the board, it does not need rotating or is rotated by 0 degrees.

(2) If the sticky note has shifted to a region near the right side of the board, it is rotated by 90 degrees to the left.

(3) If the sticky note has shifted to a region near the top side of the board, it is rotated by 180 degrees.

(4) If the sticky note has shifted to a region near the left side of the board, it is rotated by 90 degrees to the right.

The rotating module 1365 may rotate a sticky note in accordance with a user operation.

For example, every time a user clicks on a sticky note, the rotating module 1365 may rotate the sticky note by 90 degrees. When the rotating operation has finished (when no operation is performed for a predetermined time or when a rotation end button is displayed and selected), the shifting module 1360 may shift the sticky note to the side of the board on which it is in an erect state.

When the user has finished rotating a sticky note, the shifting module 1360 may shift the sticky note in accordance with the angle of rotation.

The correcting module 1370 corrects a sticky note added to the board in accordance with a user operation performed on the horizontal screen.

After a user has selected a sticky note to be corrected, either one of shifting processing by the shifting module 1360 and rotating processing by the rotating module 1365 may be executed first. If the user performs an operation to shift a sticky note prior to rotating processing, rotating processing may be executed automatically. This eliminates the need for the user to perform an operation to rotate the sticky note. If the user performs an operation to rotate a sticky note prior to shifting processing, shifting processing may be executed automatically. This eliminates the need for the user to shift the sticky note.

The image adding module 135 adds a sticky note corrected by the correcting module 1370 to the board in accordance with the orientation of the board.

The image adding module 135 may add a sticky note to the position at which it has been located before it has been corrected.

FIG. 14 illustrates an example of the data structure of a sticky-note information table 1400. The sticky-note information table 1400 has a sticky note ID field 1410, a board ID field 1412, an added position field 1415, a size field 1420, a created date field 1425, a creator field 1430, an added date field 1435, a color field 1440, a line type field 1445, a line color field 1450, a line thickness field 1455, a group field 1460, a content type field 1465, a content field 1470, and a log ID field 1475. That is, the sticky-note information table 1400 is a table in which the log ID field 1475 is added to the sticky-note information table 500 shown in FIG. 5. The log ID field 1475 stores information (log ID) for uniquely identifying a log in the second exemplary embodiment. The log ID indicates a log management table 1500, for example. The sticky-note information table 1400 is managed by the board/sticky-note management module 125.

Figures 15, 16:
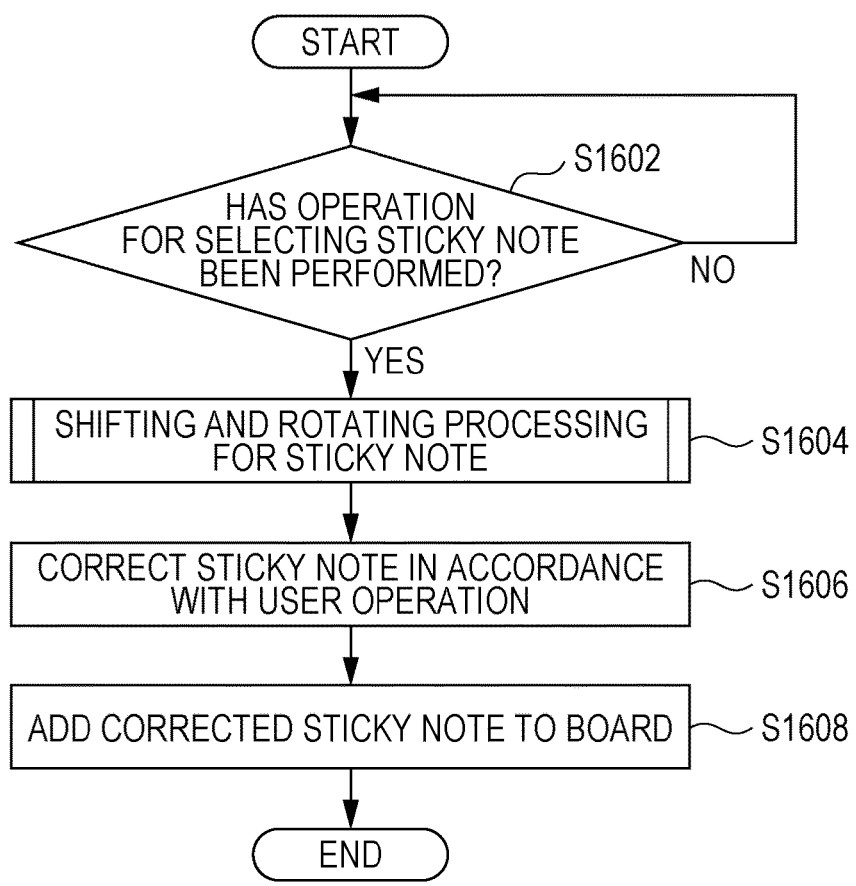
FIG. 15 illustrates an example of the data structure of a log management table.
FIG. 16 is a flowchart illustrating an example of processing executed by the second exemplary embodiment.

FIG. 15 illustrates an example of the data structure of the log management table 1500. The log management table 1500 has a log ID field 1510, a sticky note ID field 1515, a corrected date field 1520, a corrector field 1525, and a correction content field 1530. The log ID field 1510 stores a log ID. The sticky note ID field 1515 stores a sticky note ID. The corrected date field 1520 indicates the time and date at and on which this sticky note is corrected by a user operation. The corrector field 1525 indicates the user (user ID) that has made this correction. The correction content field 1530 indicates the content of correction. The log management table 1500 is managed by the board/sticky-note management module 125.

FIG. 16 is a flowchart illustrating an example of processing executed by the second exemplary embodiment.

In step S1602, it is judged whether a user has performed an operation for selecting a sticky note to be corrected. If a user has performed such an operation, the process proceeds to step S1604. If a user has not performed such an operation, the process waits until an operation is performed.

In step S1604, shifting and rotating processing for the sticky note is executed. Detailed processing of step S1604 will be discussed later with reference to the flowchart of FIG. 17.

In step S1606, the sticky note is corrected in accordance with a user operation.

In step S1608, a corrected sticky note is added to the board.

Figure 17:
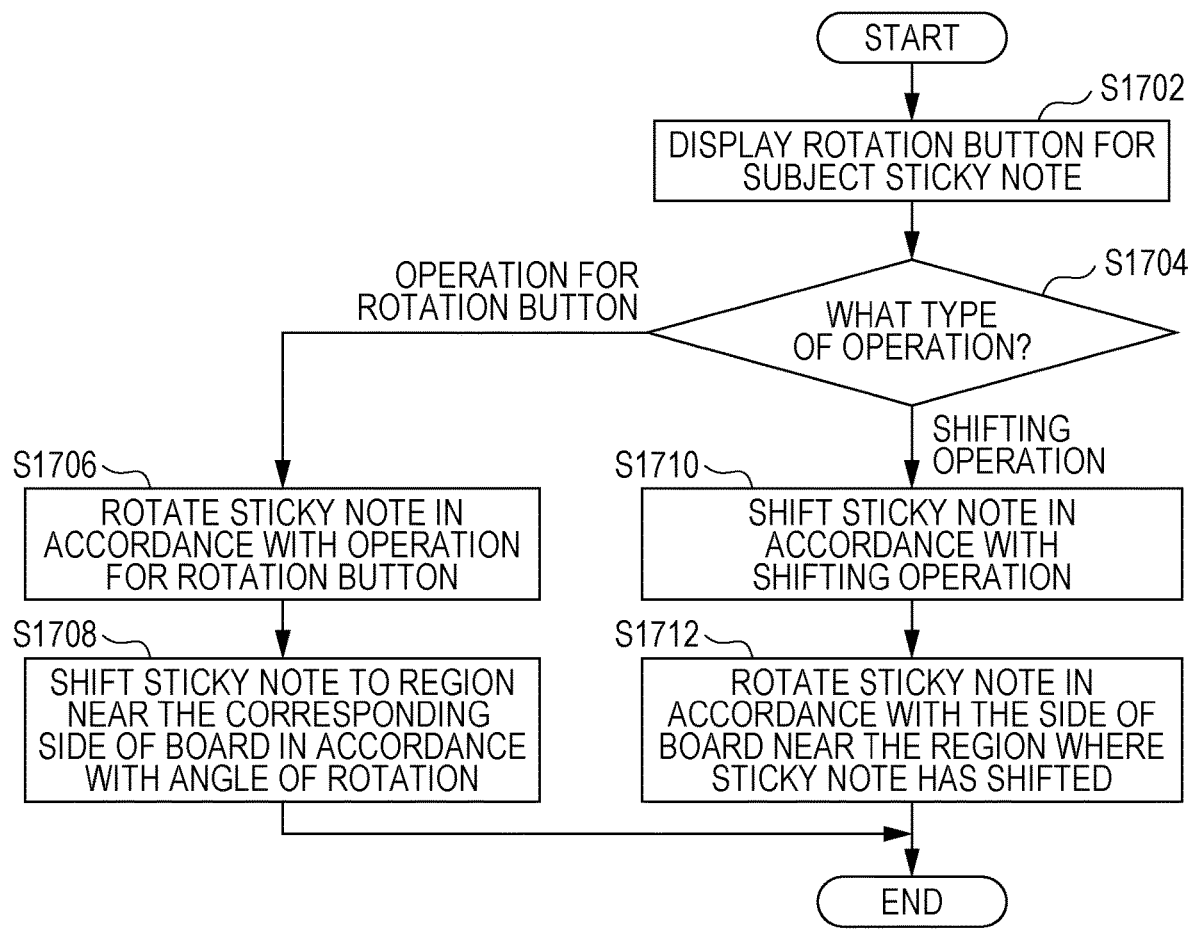
FIG. 17 is a flowchart illustrating an example of processing executed by the second exemplary embodiment.

FIG. 17 is a flowchart illustrating an example of processing executed by the second exemplary embodiment.

Figure 18:
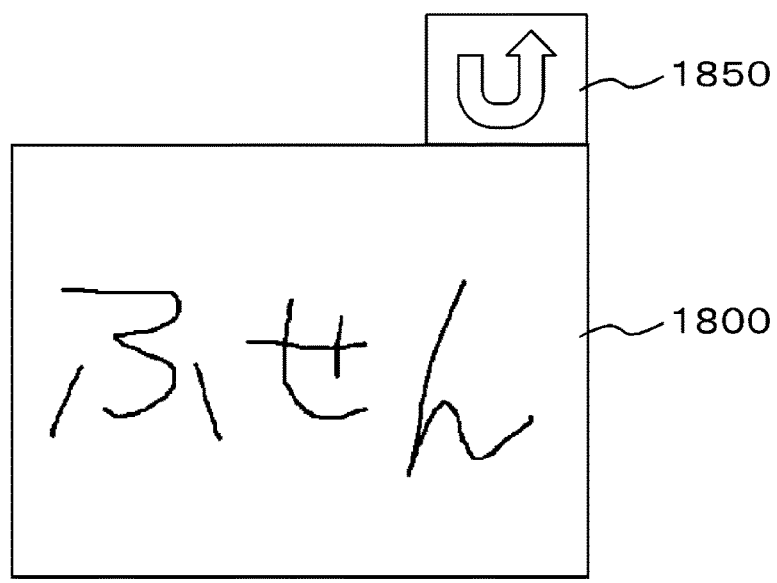
FIG. 18 illustrates an example of processing executed by the second exemplary embodiment.

In step S1702, a rotation button is displayed for a subject sticky note, as shown in FIG. 18, for example. FIG. 18 illustrates an example of processing executed by the second exemplary embodiment. A rotation button 1850 is displayed on the top side of a sticky note 1800. At this stage, the user is able to (1) rotate the sticky note 1800 by operating the rotation button 1850 or (2) shift the sticky note 1800. Instead of on the top side of the sticky note 1800, the rotation button 1850 may be displayed on the right side, bottom side, or left side of the sticky note 1800. The rotation button 1850 may alternatively be displayed to overlap the sticky note 1800. The orientation of the sticky note 1800 matches that of the board. For example, every time the user selects (clicks on) the rotation button 1850, the sticky note 1800 is rotated by 90 degrees to the right. The user may rotate the sticky note 1800 so that it is positioned in an erect state to easily correct.

In step S1704, it is judged whether the rotation button has been operated or a shifting operation has been performed. If the rotation button has been operated, the process proceeds to step S1706. If a shifting operation has been performed, the process proceeds to step S1710.

In step S1706, the sticky note is rotated in accordance with the operation for the rotation button.

In step S1708, the sticky note is shifted to a region near the corresponding side of the board in accordance with the angle of rotation.

Figure 19:
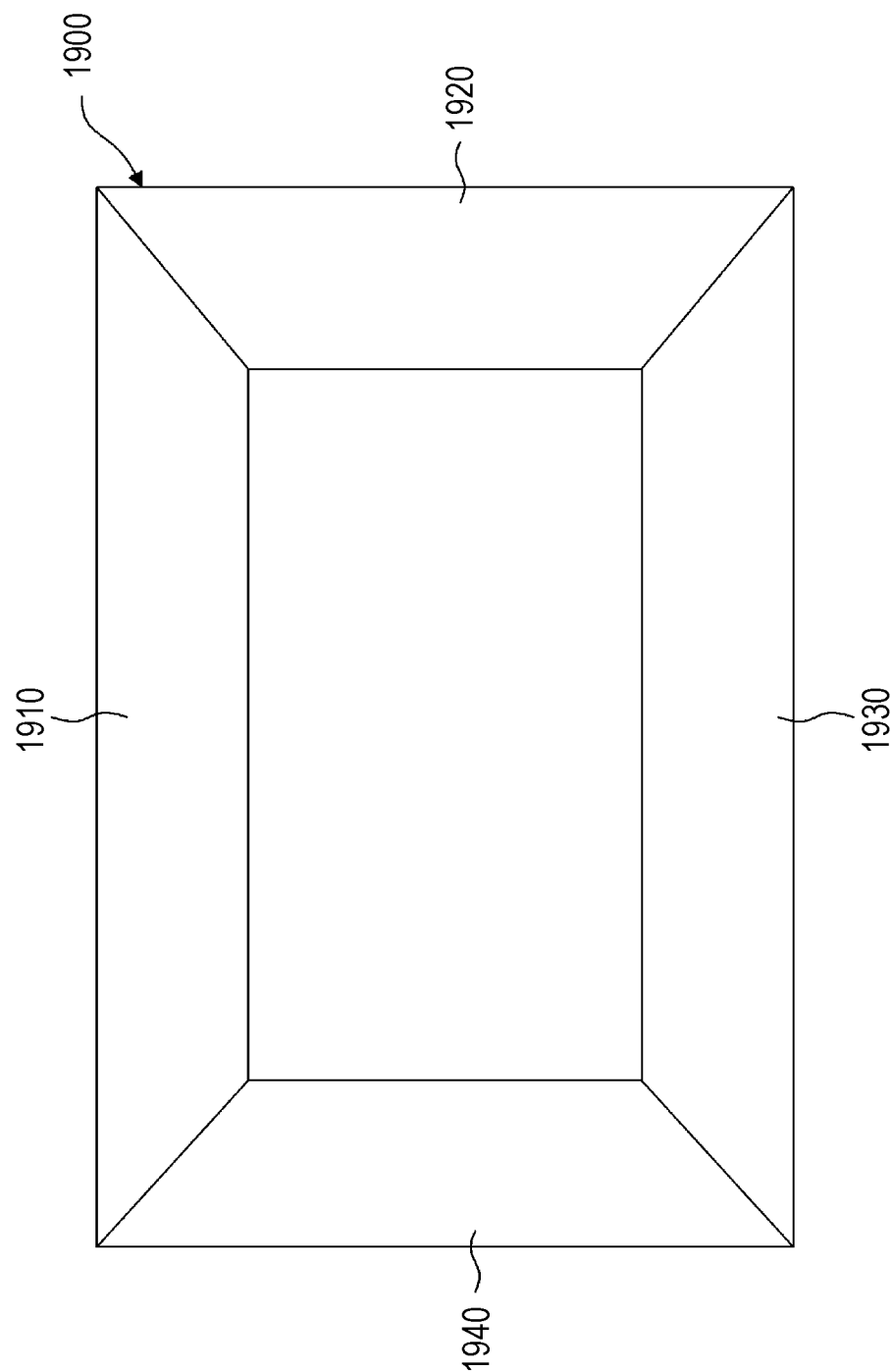
FIG. 19 illustrates examples of regions within a board.

FIG. 19 illustrates examples of regions within a board 1900. The board 1900 has a top side region 1910, a right side region 1920, a bottom side region 1930, and a left side region 1940. If the rotation button is rotated by 90 degrees to the left, the sticky note is shifted to the right side region 1920. If the rotation button is rotated by 90 degrees to the right, the sticky note is shifted to the left side region 1940. If the rotation button is rotated by 180 degrees, the sticky note is shifted to the top side region 1910. If the rotation button is rotated by 0 degrees, the sticky note is shifted to the bottom side region 1930.

In step S1710, the sticky note is shifted in accordance with the shifting operation.

In step S1712, the sticky note is rotated in accordance with the side of the board near the region where the sticky note has shifted. If the sticky note has shifted to the right side region 1920, it is rotated by 90 degrees to the left. If the sticky note has shifted to the left side region 1940, it is rotated by 90 degrees to the right. If the sticky note has shifted to the top side region 1910, it is rotated by 180 degrees. If the sticky note has shifted to the bottom side region 1930, it is rotated by 0 degrees.

Figure 20:
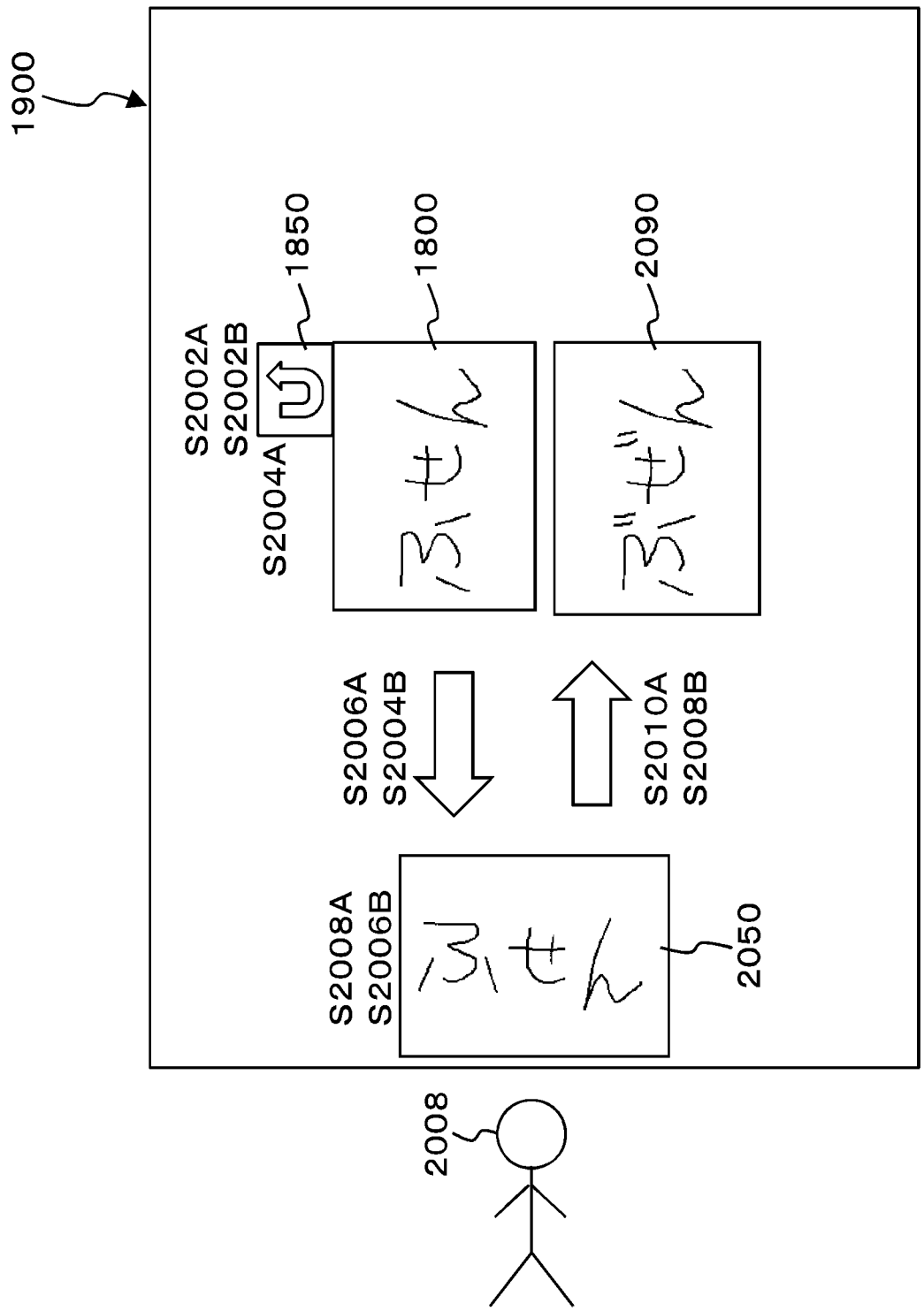
FIG. 20 illustrates an example of processing executed by the second exemplary embodiment.

FIG. 20 illustrates an example of processing executed by the second exemplary embodiment.

(1) A specific example of processing executed when the rotation button has been operated in step S1704 of the flowchart in FIG. 17 will be discussed below.

In step S2002A, upon detecting that a user 2008 has selected the sticky note 1800, the rotation button 1850 is displayed.

In step S2004A, the user 2008 operates the rotation button 1850. The sticky note 1800 is rotated in accordance with the angle of rotation. In the example in FIG. 20, the sticky note 1800 is rotated by 90 degrees to the right.

In step S2006A, the sticky note 1800 is shifted in accordance with the angle of rotation. In the example in FIG. 20, the sticky note 1800 is rotated by 90 degrees to the right, and it is automatically shifted to the left side region 1940 of the board 1900.

In step S2008A, the user 2008 corrects the content of a sticky note 2050 (rotated and shifted sticky note 1800). In the example in FIG. 20, the user 2008 corrects the content of the sticky note from ふせん to ぶぜん.

In step S2010A, upon detecting that the user 2008 has finished making a correction, the sticky note 2050 is rotated by 90 degrees to the left (in the reverse direction of that in step S2004A) and is shifted to the position of the original sticky note 1800 (sticky note 2090 in the example in FIG. 20).

(2) A specific example of processing executed when a shifting operation has been performed in step S1704 of the flowchart in FIG. 17 will be discussed below.

In step S2002B, upon detecting that the user 2008 has selected the sticky note 1800, the rotation button 1850 is displayed.

In step S2004B, the user 2008 performs a shifting operation for the sticky note 1800. Then, the sticky note 1800 is rotated in accordance with the shifting direction. In the example in FIG. 20, the sticky note 1800 has shifted to the left side region 1940, and it is thus automatically rotated by 90 degrees to the right.

In step S2006B, the user 2008 corrects the content of the sticky note 2050 (shifted and rotated sticky note 1800). In the example in FIG. 20, the user 2008 corrects the content of the sticky note from ふせん to ぶぜん.

In step S2008B, upon detecting that the user 2008 has finished making a correction, the sticky note 2050 is rotated by 90 degrees to the left (in the reverse direction of that in step S2004B) and is shifted to the position of the original sticky note 1800 (sticky note 2090 in the example in FIG. 20).

Figure 21:
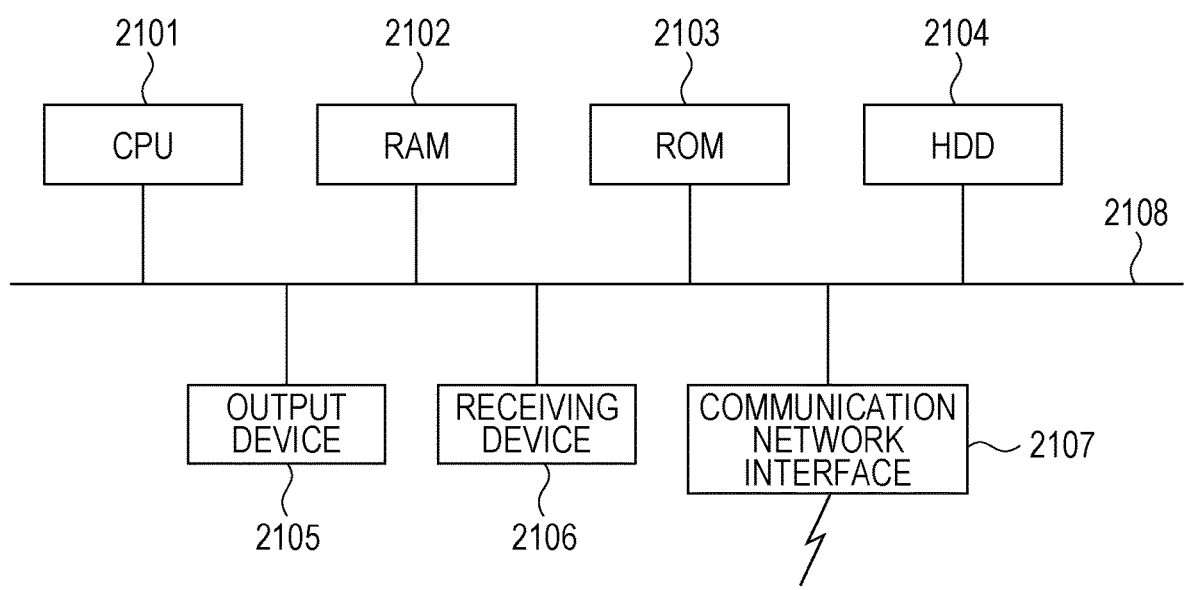
FIG. 21 is a block diagram illustrating an example of the hardware configuration of a computer implementing the exemplary embodiments.

The hardware configuration of a computer that executes a program serving as the first and second exemplary embodiments is the configuration of a general computer, such as a personal computer (PC) or a server, as shown in FIG. 21. More specifically, such a computer uses a CPU 2101 as a processor (operation unit) and a RAM 2102, a read only memory (ROM) 2103, and a hard disk drive (HDD) 2104 as storage devices. As the HDD 2104, a hard disk or a solid state drive (SSD), which is a flash memory, may be used. The computer includes the CPU 2101, the RAM 2102, the ROM 2103, the HDD 2104, an output device 2105, a receiving device 2106, a communication network interface 2107, and a bus 2108. The CPU 2101 executes a program, such as the display device 105, the display control module 110, the sticky-note display control module 115, the board display control module 120, the board/sticky-note management module 125, the sticky-note generating module 130, the image adding module 135, the detecting module 140, the rotating module 145, the correction management module 1350, the selecting module 1355, the shifting module 1360, the rotating module 1365, and the correcting module 1370. The RAM 2102 stores this program and data therein. The ROM 2103 stores a program for starting the computer. The HDD 2104 is an auxiliary storage device storing the board information table 400, the sticky-note information table 500, the stroke table 1000, the sticky-note information table 1400, and the log management table 1500. Examples of the output device 2105 are a cathode ray tube (CRT), a liquid crystal display, and a speaker. The receiving device 2106 receives data based on an operation (including motion, sound, and gaze) performed by a user on a keyboard, a mouse, a touchscreen, a microphone, or a camera (including a gaze detection camera). The communication network interface 2107 is, for example, a network interface card, for communicating with a communication network. The above-described elements are connected to one another via the bus 2108 and send and receive data to and from one another. The above-described computer may be connected to another computer configured similarly to this computer via a network.

In the above-described exemplary embodiments, concerning elements implemented by a software computer program, such a computer program is read into a system having the hardware configuration shown in FIG. 21, and the above-described exemplary embodiments are implemented by a combination of software and hardware resources.

The hardware configuration shown in FIG. 21 is only an example, and the exemplary embodiments may be configured in any manner in which the modules described in the exemplary embodiments are executable. For example, some modules may be configured as dedicated hardware (for example, an application specific integrated circuit (ASIC)), or some modules may be installed in an external system and be connected to the PC via a communication line. A system, such as that shown in FIG. 21, may be connected to a system, such as that shown in FIG. 21, via a communication line, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, or a multifunction device (image processing apparatus including two or more functions among a scanner, a printer, a copying machine, and a fax machine).

The above-described program may be stored in a recording medium and be provided. The program recorded on a recording medium may be provided via a communication medium. In this case, the above-described program may be implemented as a "non-transitory computer readable medium storing the program therein" in the exemplary embodiments.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a CD read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. Further, the program may be recorded in any form, for example, it may be compressed or encrypted, as long as it can be reconstructed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a horizontal display screen that is mounted on a table, the horizontal display screen having a perimeter comprising a plurality of sides;
a processor programmed to:
perform control to display a plurality of images on the horizontal display screen;
generate a new image on the horizontal display screen in response to input from a user,
detect a position of the user as being adjacent to one side of the plurality of sides of the horizontal display screen;
detect an orientation of the new image with respect to the plurality of images on the horizontal display screen, the orientation of the new image facing the position of the user and the orientation of the new image being different than the plurality of images;
edit a content of the new image, in response to an operation performed on the horizontal display screen by the user; and
rotate the edited new image on the horizontal display screen from the position of the user to a new position, so as to adjust the orientation of the new image to match the orientation of the plurality of images,
wherein the horizontal display screen remains fixed while the image is rotated.

2. The information processing apparatus according to claim 1, wherein the processor is programmed to detect the orientation of the new image in accordance with an orientation of written characters.

3. The information processing apparatus according to claim 2, wherein the processor is programmed to detect the orientation of written characters by using a direction of handwriting of the characters.

4. The information processing apparatus according to claim 2, wherein the processor is programmed to detect the orientation of written characters by using a stroke order of the characters.

5. The information processing apparatus according claim 1, wherein the processor is programmed to identify a character and detects the orientation of the new image in accordance with a direction in which a subsequent character follows.

6. The information processing apparatus according to claim 1, wherein the processor is programmed to detect the orientation of the new image in accordance with a position at which the user has performed an operation on the horizontal display screen.

7. The information processing apparatus according to claim 6, wherein the processor is programmed to detect the orientation of the new image also by comparing a horizontal length and a vertical length of the image.

8. The information processing apparatus according to claim 6, wherein the processor is programmed to detect the orientation of the new image also in accordance with an operation for generating borders of the image.

9. An information processing apparatus comprising:
a horizontal display screen that is mounted on a table, the horizontal display screen having a perimeter comprising a plurality of sides;
a processor programmed to:
  perform control to display a plurality of images on the horizontal display screen;
  select an image to be edited from among the plurality of images displayed on the horizontal display screen, in accordance with an operation performed on the horizontal display screen by a user;
  shift the selected image from an original position to a position of the user, the user being positioned adjacent to one side of the plurality of sides of the horizontal display screen;
  rotate the selected image with respect to the plurality of images along a plane parallel to the horizontal display screen, so as to face the position of the user and enable the user to correct the image;
  edit a content of the selected image displayed on the horizontal display screen in response to an operation performed on the horizontal display screen by the user; and
  return the image to the original position,
wherein the horizontal display screen remains fixed while the image is shifted and rotated.

10. The information processing apparatus according to claim 9, wherein the processor is programmed to rotate the image in accordance with a region to which the processor has shifted the image.

11. The information processing apparatus according to claim 9, wherein the processor is programmed to rotate the image in accordance with an operation performed by the user.

12. The information processing apparatus according to claim 11, wherein, when the user has finished rotating the image, the processor is programmed to shift the image in accordance with an angle of rotation.

13. The information processing apparatus according to claim 9, wherein:
the processor is programmed to move the image edited by the processor on the horizontal display screen in accordance with an orientation of the horizontal display screen.

14. The information processing apparatus according to claim 13, wherein the processor is programmed to move the image to a position at which the image has been located before the image has been edited.

15. A non-transitory computer readable medium storing a program causing a computer to execute a process, the process comprising:
  performing control to display a plurality of images on a horizontal display screen, the horizontal display screen being mounted on a table, and the horizontal display screen having a perimeter comprising a plurality of sides;
  generate a new image on the horizontal display screen in response to input from a user,
  detecting a position of the user as being adjacent to one side of the plurality of sides of the horizontal display screen;
  detecting an orientation of the new image with respect to the an orientation of plurality of images on the horizontal display screen, the orientation of the new image facing the position of the user, and the orientation of the new image being different than the plurality of images;
  edit a content of the new image in response to an operation performed on the horizontal display screen by the user; and
  rotating the edited new image on the horizontal display screen from the position of the user to a new position, so as to adjust the orientation of the new image to match the orientation of plurality of images,
wherein the horizontal display screen remains fixed while the image is rotated.

16. A non-transitory computer readable medium storing a program causing a computer to execute a process, the process comprising:
  performing control to display a plurality of images on a horizontal display screen, the horizontal display screen being mounted on a table, and the horizontal display screen having a perimeter comprising a plurality of sides;
  selecting an image to be edited from among the plurality of images displayed on the horizontal display screen, in accordance with an operation performed on the horizontal display screen by a user;
  shifting the selected image from an original position to a position of the user, the user being positioned adjacent to one side of the plurality of sides of the horizontal display screen;
  rotating the selected image with respect to the plurality of images along a plane parallel to the horizontal display screen, so as to face the position of the user and enable the user to correct the image; and
  edit a content of the selected image displayed on the horizontal display screen in response to an operation performed on the horizontal display screen by the user, and
  return the image to the original position,
wherein the horizontal display screen remains fixed while the image is shifted and rotated.

* * * * *